US009178796B2

(12) United States Patent
Previdi et al.

(10) Patent No.: US 9,178,796 B2
(45) Date of Patent: Nov. 3, 2015

(54) MULTI-LAYER STATEFUL PATH COMPUTATION ELEMENT ARCHITECTURE

(71) Applicant: Cisco Technology, Inc., San Jose, CA (US)

(72) Inventors: Stefano Previdi, Rome (IT); Jean-Philippe Vasseur, Saint Martin d'Uriage (FR); Jan Medved, Pleasanton, CA (US); David Ward, Los Gatos, CA (US); Clarence Filsfils, Brussels (BE); Christopher Metz, Danville, CA (US)

(73) Assignee: Cisco Technology, Inc., San Jose, CA (US)

( * ) Notice: Subject to any disclaimer, the term of this patent is extended or adjusted under 35 U.S.C. 154(b) by 187 days.

(21) Appl. No.: 13/930,081

(22) Filed: Jun. 28, 2013

(65) Prior Publication Data

US 2015/0003283 A1   Jan. 1, 2015

(51) Int. Cl.
*H04L 12/751* (2013.01)
*H04L 12/723* (2013.01)
*H04L 12/715* (2013.01)

(52) U.S. Cl.
CPC .............. *H04L 45/02* (2013.01); *H04L 45/04* (2013.01); *H04L 45/50* (2013.01); *H04L 45/64* (2013.01)

(58) Field of Classification Search
CPC ... H04L 41/069; H04L 41/0686; H04L 45/02; H04L 45/50; H04L 67/10
USPC .......................... 370/254, 469, 235, 389, 392
See application file for complete search history.

(56) References Cited

U.S. PATENT DOCUMENTS

| | | | |
|---|---|---|---|
| 5,858,243 A * | 1/1999 | Bedard ........................ | 210/682 |
| 7,515,525 B2 | 4/2009 | Appanna et al. | |
| 7,558,276 B2 | 7/2009 | Vasseur et al. | |
| 7,599,302 B2 * | 10/2009 | Vasseur et al. ................ | 370/248 |
| 7,957,268 B2 | 6/2011 | Appanna et al. | |
| 8,467,383 B2 | 6/2013 | Chigurupati et al. | |
| 2005/0270986 A1 * | 12/2005 | Watanabe et al. ............. | 370/252 |
| 2011/0258257 A1 * | 10/2011 | Previdi ......................... | 709/205 |

OTHER PUBLICATIONS

Alimi, et al., "ALTO Protocol", IETF Trust, ALTO WG, Internet Draft, draft-ietf-alto-protocol-16, May 2013, 80 pages.

(Continued)

*Primary Examiner* — Jamal Javaid
(74) *Attorney, Agent, or Firm* — Parker Ibrahim & Berg LLC; James M. Behmke; Stephen D. LeBarron

(57) ABSTRACT

In one embodiment, a stateful computing entity in a computer network determines underlying network information (physical and/or optical) for the computer network, and also determines topologies (Internet Protocol (IP) and/or Multiprotocol Label Switching (MPLS)) for the computer network and associated resource information. Further, the stateful computing entity determines label switched path (LSP) state information for the computer network. The stateful computing entity may then build network state knowledge by aggregating the underlying network information, the topologies and associated resource information, and the LSP state information, and establishes communication within a dynamic network of other stateful computing entities sharing network state knowledge for parallel computation performance. Accordingly, the stateful computing entity may perform network computation based on the network state knowledge.

21 Claims, 23 Drawing Sheets

(56) References Cited

OTHER PUBLICATIONS

Crabbe, et al., "PCEP Extensions for Stateful PCE", IETF Trust, Network Working Group, Internet Draft, draft-ietf-pce-stateful-pce-00, Feb. 2012, 52 pages.

Farrel, et al., "A Path Computation Element (PCE)-Based Architecture", The Internet Society, Network Working Group, Request for Comments 4655, Aug. 2006, 41 pages.

Giacalone, et al., "OSPF Traffic Engineering (TE) Metric Extensions", IETF Trust, Network Working Group, Internet Draft, draft-ietf-ospf-te-metric-extensions-04, Jun. 2013, 18 pages.

Ginsberg, et al., "Advertising Generic Information in IS-IS", IETF Trust, Network Working Group, Internet Draft, draft-ietf-isis-genapp-04.txt, Nov. 2010, 13 pages.

Gredler, et al., "North-Bound Distribution of Link-State and TE Information Using BGP", IETF Trust, Internet Draft, draft-gredler-idr-ls-distribution-01, Mar. 2012, 31 pages.

Pan, et al., "Fast Reroute Extensions to RSVP-TE for LSP Tunnels", The Internet Society, Network Working Group, Request for Comments 4090, May 2005, 39 pages.

Previdi, et al., "Distributed Stateful Path Compuation Element Overlay Architecture", U.S. Appl. No. 13/524,071, filed Jun. 15, 2012, 47 pages, U.S. Patent and Trademark Office.

Previdi, et al., "IS-IS Traffic Engineering (TE) Metric Extensions", IETF Trust, Network Working Group, Internet Draft, draft-previdi-isis-te-metric-extensions-03, Feb. 2013, 14 pages.

Vasseur, et al., "Path Computation Element (PCE) Communication Protocol (PCEP)", IETF Trust, Network Working Group, Request for Comments 5440, Mar. 2009, 87 pages.

\* cited by examiner

MULTI-LAYER STATEFUL PATH COMPUTATION ELEMENT ARCHITECTURE

TECHNICAL FIELD

The present disclosure relates generally to computer networks, and, more particularly, to path computation elements (PCEs).

BACKGROUND

Software-defined networking (SDN) builds computer networking equipment and software that separates and abstracts elements of these systems (e.g., the control plane and the data plane), to allow network administrators to manage network services more easily through abstraction of lower level functionality into virtual services. This replaces having to manually configure hardware, an important feature for network virtualization. In an SDN architecture, however, there is currently no complete view of the network infrastructure (from physical/optical layers to application layers), and no efficient multi-layer computation.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a stateful computing entity in a computer network determines underlying network information (physical and/or optical) for the computer network, and also determines topologies (Internet Protocol (IP) and/or Multiprotocol Label Switching (MPLS)) for the computer network and associated resource information. Further, the stateful computing entity determines label switched path (LSP) state information for the computer network. The stateful computing entity may then build network state knowledge by aggregating the underlying network information, the topologies and associated resource information, and the LSP state information, and establishes communication within a dynamic network of other stateful computing entities sharing network state knowledge for parallel computation performance. Accordingly, the stateful computing entity may perform network computation based on the network state knowledge.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, and others.

Since management of interconnected computer networks can prove burdensome, smaller groups of computer networks may be maintained as routing domains or autonomous systems. The networks within an autonomous system (AS) are typically coupled together by conventional "intradomain" routers configured to execute intradomain routing protocols, and are generally subject to a common authority. To improve routing scalability, a service provider (e.g., an ISP) may divide an AS into multiple "areas" or "levels." It may be desirable, however, to increase the number of nodes capable of exchanging data; in this case, interdomain routers executing interdomain routing protocols are used to interconnect nodes of the various ASes. Moreover, it may be desirable to interconnect various ASes that operate under different administrative domains. As used herein, an AS, area, or level is generally referred to as a "domain" and a router used to interconnect multiple domains is generally referred to as a "border router" or BR. In the case of areas rather than ASes since the routers are under a common authority, a single router may in fact serve as an exit border router of one area and an entry border router of another area.

Figure 1A:
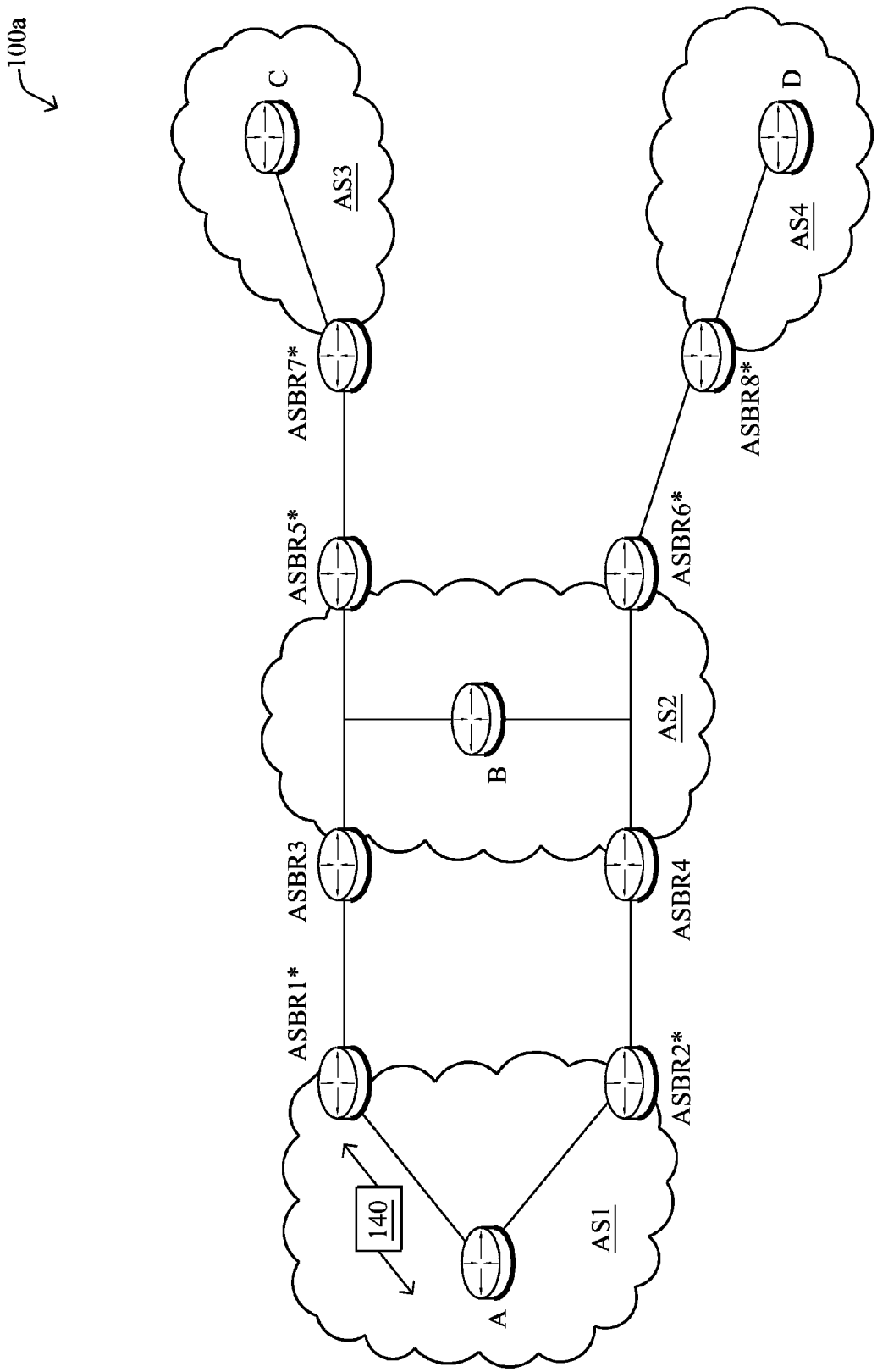
FIGS. 1A-1B illustrate example computer networks.

FIG. 1A is a schematic block diagram of an exemplary computer network 100a comprising autonomous system AS2, which is interconnected with a plurality of other autonomous systems AS1, AS3, and AS4. An Autonomous System (AS) is herein defined to be a group of intermediate nodes, such as intradomain routers, within a network that are subject to a common authority and execute one or more intradomain routing protocols. Although, each AS is illustratively an autonomous system, those skilled in the art will appreciate that the ASes may alternatively be configured as routing domains or other networks or subnetworks. The autonomous system AS1 includes intradomain routers such as border routers ASBR1* and ASBR2* through which communication, such as data packets, may pass into and out of the autonomous system to border routers ASBR3 and ASBR4, respectively of AS2. AS2 also includes border routers ASBR5* and ASBR6* in communication with border routers ASBR7* and ASBR8* of ASes 3 and 4, respectively. Moreover, within AS1, AS2, AS3, and AS4, there are exemplary intradomain routers A, B, C, and D, respectively.

Figure 1B:
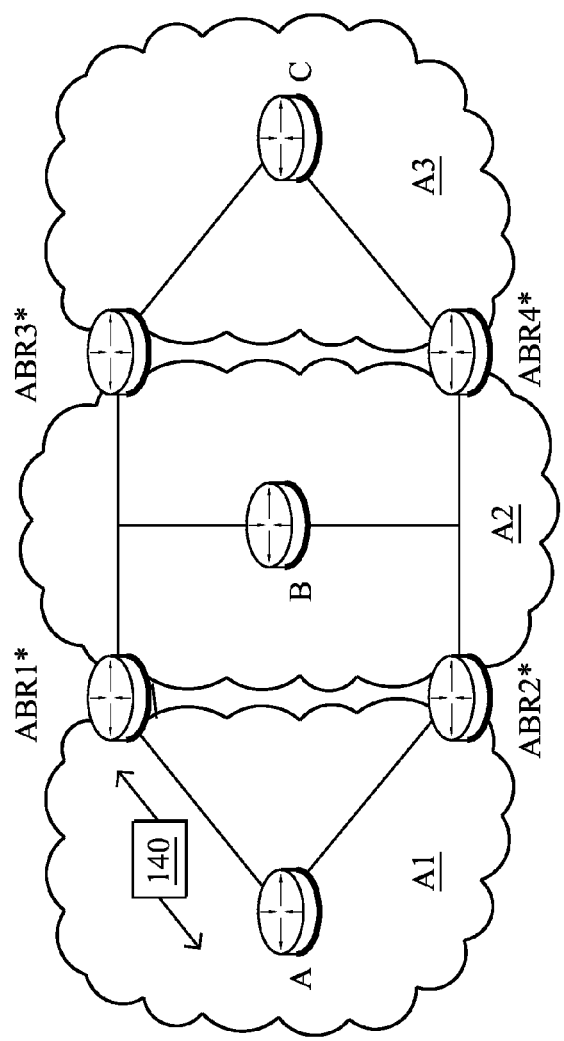

Alternatively or in addition, FIG. 1B is a schematic block diagram of an exemplary computer network 100b comprising areas A1, A2, and A3, each having at least one intradomain router, A, B, and C, respectively. In particular, A1 and A2 share border routers ABR1* and ABR2*, while A2 and A3 share ABR3* and ABR4. As used herein, an area is a collection of routers that share full network topology information with each other but not necessarily with routers outside the area. The term area as used herein also encompasses the term "level" which has a similar meaning for networks based on their chosen routing protocol.

Data packets 140 (e.g., discrete frames or packets of data) may be exchanged among the nodes/devices of the computer network 100 (100a and 100b, generically) using predefined network communication protocols such as the Transmission Control Protocol/Internet Protocol (TCP/IP), User Datagram Protocol (UDP), Asynchronous Transfer Mode (ATM) protocol, Frame Relay protocol, Internet Packet Exchange (IPX) protocol, etc. In this context, a protocol consists of a set of rules defining how the nodes interact with each other. For example, in addition to user data, routing information may be distributed among the routers within an AS (e.g., between areas A1-A3) using pre-determined "interior" gateway protocols (IGPs), such as conventional distance-vector protocols or, illustratively, link-state protocols, through the use of link-state advertisements (LSAs) or link-state packets. Moreover, data packets containing network routing information may be exchanged among the autonomous systems AS1-AS4 using "external" gateway protocols, such as the Border Gateway Protocol (BGP).

Those skilled in the art will understand that any number of nodes, devices, links, etc. may be used in the computer network, and that the view shown herein is for simplicity. Furthermore, the techniques described below with reference to inter-AS path computation may be used in the context of inter-area path computation and, under certain conditions, the techniques described with reference to inter-area path computation may be used for inter-AS path computation.

Figure 2:
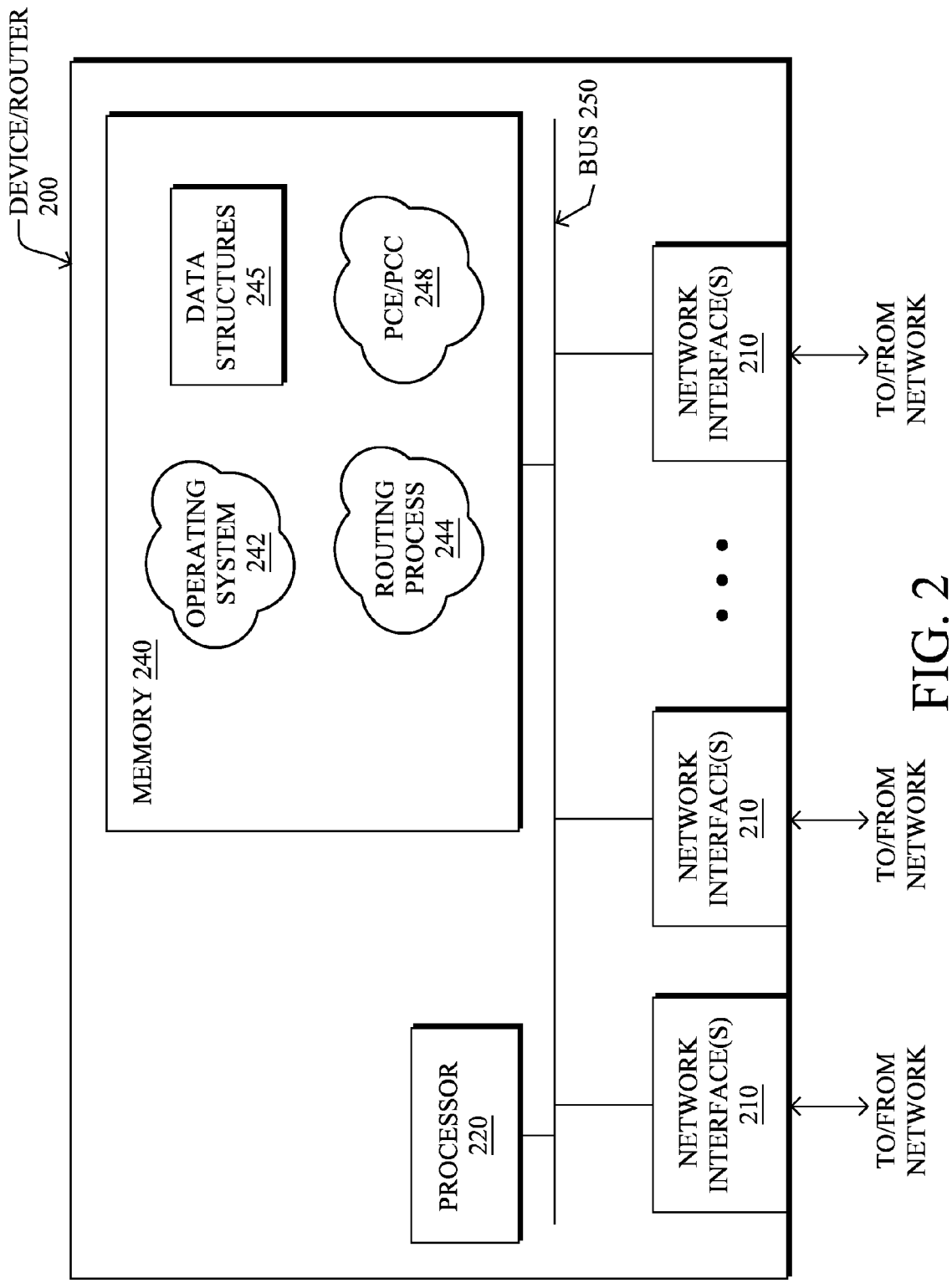
FIG. 2 illustrates an example network device/node.

FIG. 2 is a schematic block diagram of an example node/device (e.g., router) 200 that may be used with one or more embodiments described herein, e.g., as any of the devices in FIGS. 1A and 1B above, particularly as a path computation element or client (PCE or PCC) described herein. The device may comprise one or more network interfaces 210, at least one processor 220, and a memory 240 interconnected by a system bus 250.

The network interface(s) 210 contain the mechanical, electrical, and signaling circuitry for communicating data over links coupled to the network 100. The network interfaces may be configured to transmit and/or receive data using a variety of different communication protocols, including, inter alia, TCP/IP, UDP, ATM, synchronous optical networks (SONET), wireless protocols, Frame Relay, Ethernet, Fiber Distributed Data Interface (FDDI), etc. Notably, a physical network interface 210 may also be used to implement one or more virtual network interfaces, such as for virtual private network (VPN) access, known to those skilled in the art.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245, such as routing databases/link state databases (LSDBs)/Traffic Engineering databases (TEDs) and or tables. An operating system 242, portions of which are typically resident in memory 240 and executed by the processor, functionally organizes the device by, among other things, invoking operations in support of software processes and/or services executing on the device. These software processes and/or services may comprise routing process/services 244, and an illustrative PCE/PCC process 248, as described herein. Note that while the processes are shown in centralized memory 240, alternative embodiments provide for certain aspects of the techniques herein to be specifically operated within the network interfaces 210.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as the Interior Gateway Protocol (IGP) (e.g., Open Shortest Path First, "OSPF," and Intermediate-System-to-Intermediate-System, "IS-IS") as IGP services, the Border Gateway Protocol (BGP), etc., as will be understood by those skilled in the art. These functions may be configured to manage routing and forwarding information databases/tables (data structures 245) containing, e.g., data used to make routing and forwarding decisions. Notably, routing services 244 may also perform functions related to virtual routing protocols, such as maintaining virtual routing/forwarding (VRF) instances (illustratively a component of tables 245) as will be understood by those skilled in the art.

Changes in the network topology within the local domain (network 100) may be communicated among nodes/routers 200 within the network 100 using routing services 244, for example, IGP services such as the conventional OSPF and IS-IS link-state protocols. Suppose, for example, that a communication link fails or a cost value associated with a network node changes. Once the change in the network's state is detected by one of the routers, that router may flood an IGP (or BGP) advertisement (message/packet 140) communicating the change to the other routers in the network. In this manner, each of the routers eventually "converges" to an identical view of the network topology.

Multi-Protocol Label Switching (MPLS) is a known protocol in which a path for a source-destination pair may be established along label switched routers (LSRs), and values required for forwarding a packet between adjacent LSRs in the path together with headers or "labels" are prepended to the packet. The labels are used to direct the packet to the correct interface and "next hop" router. The labels precede any IP or other headers allowing use of smaller outer headers for the packet. The path for the source-destination pair, termed a Label Switched Path (LSP), can be established according to various different approaches. One such approach is Label Distribution Protocol (LDP) in which each router in the path sends its label to neighbor routers according to its IP routing table. LDP labels are sent to the neighbor routers in a label mapping message which can include as one of its TLV (Type Length Value) fields a path vector specifying the LSP. For each LSP created, a forwarding equivalent class (FEC) is associated with the path specifying which packets are mapped to the path. A Label Forwarding Information Base (LFIB) (data structure 245) stores the FEC, the next-hop information for the LSP, and the label required by the next hop.

Also, MPLS Traffic Engineering (TE) has been developed to meet data networking requirements such as guaranteed available bandwidth or fast reroute (FRR). MPLS TE exploits modern label switching techniques to build end-to-end tunnels based on a series of constraints through an IP/MPLS network of LSRs. These tunnels are a type of label switched path (LSP) and thus are generally referred to as MPLS TE-LSPs.

Generally, a tunnel is a logical structure that encapsulates a packet (a header and data) of one protocol inside a data field of another protocol packet with a new header. In this manner, the encapsulated data may be transmitted through networks that it would otherwise not be capable of traversing or would otherwise traverse in a less efficient manner. More importantly, a tunnel creates a transparent virtual network link between two network nodes that is generally unaffected by physical network links or devices (i.e., the physical network links or devices merely forward the encapsulated packet based on the new header). While one example of a tunnel is an MPLS TE-LSP, other known tunneling methods include, among others, the Layer Two Tunnel Protocol (L2TP), the Point-to-Point Tunneling Protocol (PPTP), IP tunnels, and generic routing encapsulation (GRE) tunnels.

In particular, establishment of a tunnel (e.g., TE-LSP) requires computation of a path between a head-end node (LSR) to a tail-end node, signaling along the path (e.g., through resource reservation protocol (RSVP)-TE), and modification of forwarding tables at intermediate nodes (LSRs) along the path. Optimally, the computed path is the "shortest" path, as measured in some metric (cost, length, etc.), that satisfies all relevant LSP Traffic Engineering constraints or "attributes," such as e.g., required bandwidth, "affinities" (administrative constraints to avoid or include certain links), priority, class type, etc. In addition, a number of techniques have been developed to allow for dynamic bandwidth adjustment of the signaled bandwidth using RSVP-TE, the allocation of dynamic preemptions so as to mitigate the probability of dead-lock due to bin-packing issues or bandwidth fragmentation, distributed re-optimization techniques to defragment bandwidth in the network, distributed techniques for backup tunnel computation maximizing back-up bandwidth usage according to the assumption of single link/node/SRLG resources (bandwidth sharing between independent resources), etc.

Occasionally, a network element (e.g., a node or link) will fail, causing redirection of the traffic that originally traversed the failed network element to other network elements that bypass the failure. Generally, notice of this failure is relayed to the nodes in the network through an advertisement of the new network topology, e.g., an IGP or BGP Advertisement, and routing tables are updated to avoid the failure accordingly. Reconfiguring a network in response to a network element failure using, e.g., pure IP rerouting, can be time consuming. Many recovery techniques, however, are available to provide fast recovery and/or network configuration in the event of a network element failure, such as Fast Reroute, e.g., MPLS TE Fast Reroute (RFC4090).

Fast Reroute (FRR) has been widely deployed to protect against network element failures, where "backup tunnels" are created to bypass one or more protected network elements (e.g., links, shared risk link groups (SRLGs), and nodes). When the network element fails, traffic is quickly diverted ("Fast Rerouted") over a backup tunnel to bypass the failed element, or more particularly, in the case of MPLS, a set of primary TE-LSPs (tunnels) is quickly diverted. Specifically, the point of local repair (PLR) node configured to reroute the traffic inserts ("pushes") a new label for the backup tunnel, and the traffic is diverted accordingly. Once the failed element is bypassed, the backup tunnel label is removed ("popped") by the last LSR along the backup path, and the traffic is routed along the original path according to the next label (e.g., that of the original TE-LSP). Notably, the backup tunnel, in addition to bypassing the failed element along a protected primary TE-LSP, also intersects the primary TE-LSP, i.e., it begins and ends at nodes along the protected primary TE-LSP.

As noted above, tunnels have been used for a number of applications such as the support of virtual private networks (VPNs) or Traffic Engineering following source routed paths hop-by-hop. Among the number of tunneling techniques developed over the past decade, MPLS TE has been widely deployed by service providers and large enterprise networks in order to optimize the network resource in light of specified traffic demand (traffic engineering) or in support of fast restoration of traffic in case of link and/or node failures thanks to local protection techniques as MPLS TE Fast Reroute that rely on local reroute upon fast detection of a network element failure. MPLS TE-LSPs, for example, were originally computed using distributed constrained shortest path first (CSPF) algorithms where each tunnel head-end was responsible for the computation of the LSP path in the network, using a constrained SPF (e.g., Dijsktra) according to the Traffic Engineering Database (TED) distributed by a link state routing protocol such as OSPF or IS-IS.

A series of challenging problems arose that required the use of a new path computation model known as the Path Computation Element (PCE) model, such as defined in RFC4655. The PCE model generally consists of relying on an external engine (PCE) responsible for the computation of tunnels in the network. Head-ends (or Path Computation Clients—PCCs) send requests to PCEs (PCReq messages) using the PCEP signaling protocol (RFC5440), and receive computed paths thanks to replies (PCRep messages). PCEs have been used mostly for back-up tunnel path computation and inter-domain (Inter-area/AS) path computations where per-domain path computation was the only (potentially very sub-optimal) technique available prior to the PCE.

In particular, the PCE is an entity having the capability to compute paths between any nodes of which the PCE is aware in an AS or area (domain). (PCE process/services 248 contain computer executable instructions executed by processor 220 to perform functions related to PCEs in general, and in accordance with one or more embodiments described herein.) PCEs are especially useful in that they are more cognizant of network traffic and path selection within their AS or area, and thus may be used for more optimal path computation. A head-end node/LSR may further operate as a path computation client (PCC) configured to send a path computation request to the PCE, and receive a response with the computed path, which potentially takes into consideration other path computation requests from other PCCs. It is important to note that when one PCE sends a request to another PCE, it acts as a PCC. PCEs conventionally have limited or no visibility outside of their surrounding area(s), level(s), or AS. A PCC can be informed of a PCE either by pre-configuration by an administrator, or by a PCE Discovery (PCED) message ("advertisement") carried within a routing protocol message, which is sent from the PCE within its area or level or across the entire AS to advertise its services.

Generally, PCE functions are hosted on a BR between domains for inter-domain path computation, and there are typically at least two BRs, so there is no single point of failure. For example, ASBRs and ABRs tagged with an asterisk (*) in FIGS. 1A and 1B may be configured as PCEs. Note that while illustratively PCE functions are generally hosted on a BR, the techniques described herein are equally applicable to PCEs not hosted on a BR, accordingly.

In PCE-based networks deployed so far, PCEs have been stateless: LSPs were computed by the PCE according to the Traffic Engineering Database (TED) fed in most cases by the routing protocol (ISIS or OSPF, more recently potentially using BGP) without requiring any state maintenance. Although the PCE architecture did refer to the potential use of stateful PCEs as a potentially more optimal model that would keep track of all LSPs states in the network when computing LSPs, the model was seen to be quite complex in terms of signaling, states maintenance, etc. with a number of very challenging issues.

It became apparent that stateful PCE was the solution of choice for several applications such as inter-layer optimizations or global optimization, but only recently did the number of use cases grow significantly considering increased requirements for advanced optimization of bandwidth resources. To that end, stateful PCEs have been implemented, and a stateful PCE draft standard was adopted as the IETF Working Document mentioned above entitled "PCEP Extensions for Stateful PCE", which specifies several new PCEP messages, allowing PCC to update the PCE on their LSP states (PCRpt messages), control LSP delegation (ability for the PCE to remotely control an LSP) and for the PCE to send LSP requests to PCC to learn states (PCUpd messages). As defined in the above document, a function can be initiated either from a PCC towards a PCE (C-E) or from a PCE towards a PCC (E-C). The new functions are:

Capability negotiation (E-C,C-E): Both the PCC and the PCE must announce during PCEP session establishment that they support PCEP Stateful PCE extensions defined in this document;

LSP state synchronization (C-E): After the session between the PCC and a stateful PCE is initialized, the PCE must learn the state of a PCC's LSPs before it can perform path computations or update LSP attributes in a PCC;

LSP Update Request (E-C): A PCE requests modification of attributes on a PCC's LSP;

LSP State Report (C-E): A PCC sends an LSP state report to a PCE whenever the state of an LSP changes; and LSP control delegation (C-E,E-C): A PCC grants to a PCE the right to update LSP attributes on one or more LSPs; the PCE becomes the authoritative source of the LSP's attributes as long as the delegation is in effect; the PCC may withdraw the delegation or the PCE may give up the delegation.

Stateful PCEs are slated to play a major role in future tunnel-enabled network architectures. Though the use of stateful PCEs is intended to solve a wide range of problems, they also bring a number of hard technical issues, including, but not limited to:

1) There are a number of situations where a PCE may receive a burst of signaling requests in the network, which is in contrast with the distributed nature of CSPF: when performing global reoptimizations, rerouting a large number of LSPs upon a link/node failure (in some networks, a single failure may lead to tens of thousands of LSP failures).

2) State maintenance is another critical issue. Stateful PCEs are required to maintain LSP states. When recomputing an LSP, this may first require displacing other LSPs in the network, leading to a very large number of signaling exchanges in the network.

3) Scaling of the overall architecture: attempts have been made to scale the stateful PCE architecture by distributing computation among several PCEs and allowing for inter-PCE communication when performing parallel computations of LSPs. These models have shown very limited scaling due to the number of signaling exchanges between PCEs (similar to IPCs between CPU in massive parallel computing issues).

4) PCE failure during operation of maintenance, which is not an issue when the PCE is stateless. Unfortunately, the issue is significantly more complex when the PCE fails during a maintenance operation (for example, when some LSPs have been updated and the PCE fails before reaching other head-ends and notifying them of an LSP path change that is required for the other LSPs to be routed in the network), thus leaving the network in a very unstable/unknown state.

Multi-Layer Stateful PCE Architecture

As noted above, software-defined networking (SDN) builds computer networking equipment and software that separates and abstracts elements of these systems (e.g., the control plane and the data plane), to allow network administrators to manage network services more easily through abstraction of lower level functionality into virtual services. This replaces having to manually configure hardware, an important feature for network virtualization. In an SDN architecture, however, there is currently no complete view of the network infrastructure (from physical/optical layers to application layers), and no efficient multi-layer computation.

The techniques herein provide a multi-layer, multi-encapsulation, and stateful PCE architecture in order to address SDN requirements to allow operators to consistently and efficiently address such requirements in terms of network guidance, traffic engineering, demand engineering, content and video routing, multicast, etc. In particular, PCEs are extended to stateful and multi-layer capabilities as described herein in order to deploy SDN technology within a service provider's infrastructure. Example use cases addressed by this architecture that are described in greater detail below comprise, for example, network guidance, optical path computation, IP/MPLS Traffic Engineering, etc.

Specifically, according to one or more embodiments of the disclosure as described in detail below, a stateful computing entity (e.g., PCE) in a computer network determines underlying physical and/or optical network information for the computer network, and also determines IP and/or MPLS topologies for the computer network and associated resource information. Further, the stateful computing entity determines LSP state information for the computer network. The stateful computing entity may then build network state knowledge by aggregating the underlying physical/optical network information, the IP/MPLS topologies and associated resource information, and the LSP state information, and establishes communication within a dynamic network of other stateful computing entities sharing network state knowledge for parallel computation performance. Accordingly, the stateful computing entity may perform network computation (e.g., network guidance and/or path computation) based on the network state knowledge.

Illustratively, the techniques described herein may be performed by hardware, software, and/or firmware, such as in accordance with the PCE/PCC process 248, which may contain computer executable instructions executed by the processor 220 to perform PCE/PCC functions relating to the techniques described herein (depending upon whether the acting device is a PCE or a PCC), e.g., in conjunction with routing process 244. For example, the techniques herein may be treated as extensions to conventional protocols, such as various PCE/PCC protocols (e.g., stateful PCE/PCC protocols), and as such, may be processed by similar components understood in the art that execute those protocols, accordingly. Notably, in this instance, a non-PCE/PCC device, e.g., an LSR, may also be configured to operate according to an illustrative PCE/PCC process 248, e.g., to perform the actions in conjunction with a PCE as described herein.

Operationally, the stateful multilayer PCE (ML-PCE) architecture extends the current PCE architecture by introducing multi-layer capability. The new architecture consists of the following functions:

1. Information acquisition: topology, state (including established/signaled paths), static/configuration, resources, statistics, performance metrics from a network management server (NMS) and, in general, any layer specific information available in the router/switch.
2. Computational algorithms: a set of algorithms used by the PCE so to compute paths, routes, cross-connect of existing tunnels/paths. Algorithms include, for example, CSPF, SPF, radio SPF (RSPF), Network Guidance such as application layer traffic optimization (ALTO) computation and/or network positioning system (NPS) computation, and so on.
3. Application Programming Interfaces (APIs): a different set of APIs are used by the PCE in order to allow clients to request SDN services (e.g., path computation, network guidance, etc.) as well as a set of APIs used by the PCE to retrieve information from the infrastructure as well as introduce state into the multi-layer infrastructure. Examples of APIs are: PCEP, BGP-LS (link state), ALTO, IGP, BGP, etc.
4. Multi-PCE Communication. Each provide edge (PE) uses a specific API (distributed hash table or "DHT" based) so to synchronize with any other PCE operating within the same routing domain.

The overall architecture is illustrated below with reference to FIGS. 3-11H. In particular, the techniques herein describe the overall architecture where the PCE server makes use of all the functions so to allow a Service Provider network to optimize path computation and signaling by combining information derived from different layers (from physical/optical to application).

Regarding information acquisition (1), mechanisms may be used by the ML-PCE in order to acquire topology and state information from each layer the ML-PCE operates in. For instance, ML-PCE acquires information from the IP/MPLS layer using APIs such as IGP/BGP routing protocols (ISIS, OSPF, BGP) as well as BGP-LS which is an is extension of the BGP protocol that is used for carrying topology information (details are available in an IETF Internet Draft entitled "North-Bound Distribution of Link-State and TE Information using BGP"<draft-gredler-idr-ls-distribution>).

The ML-PCE is connected to the IP/MPLS layer and receives the IP/MPLS topology thanks to the above mentioned protocols. The use of BGP-LS, and according to deployment and operations guidelines when using BGP-LS, the ML-PCE acquires the end-to-end topology visibility of the IP/MPLS layer (regardless of area boundaries). Moreover, the ML-PCE may even acquire multi-AS topologies if BGP-LS can be used in different ASes.

The stateful ML-PCE also acquires information about existing LSP state in the network. The stateful extension to PCEP (e.g., <draft-ietf-pce-stateful-pce>, noted above) allows the ML-PCE to receive from each head-end state information about established LSP tunnels. This is a major improvement for the ML-PCE capabilities as it allows it to have a complete view of the network layer: topology, resources, and LSP state. Tasks such as re-optimization (global or partial) are thus made more efficient.

Note that ML-PCE may also acquire part of the optical information through IGP TE metric extensions (in the network layer) such as those found in the IETF Internet Drafts entitled "OSPF Traffic Engineering (TE) Metric Extensions"<draft-ietf-ospf-te-metric-extensions> and "IS-IS Traffic Engineering (TE) Metric Extensions"<draft-previdi-isis-te-metric-extensions>.

The ML-PCE also operates at the optical layer by collecting the optical topology by connecting to the GMPLS-OSPF domain (when used). Also, BGP-LS may be used in the optical layer by routers that will do the translation from GMPLS-OSPF into BGP-LS extensions for optical topology distribution.

Regarding computational algorithms (2), the PCE executes different algorithms for different services, such as Network Guidance (NPS/ALTO), Path Computation (including multi-encapsulation cross connect), etc.

For Network Guidance ALTO, the ML-PCE server implements network guidance algorithms as implemented in NPS (Proximity) services (e.g., available from Cisco Systems, Inc.) that locate applications, services, and content for service delivery in the network (e.g., cloud), as well as those described in commonly owned, co-pending US Patent Application Publication No. 2011/0258257, entitled "Proximity aggregated network topology algorithm (PANTA)", and also those from the ALTO IETF specification entitled "ALTO Protocol"<draft-ietf-alto-protocol>. The algorithms are enhanced by integrating into the topology computation multilayer information consisting of a) optical topology information, when available (including ISIS/OSPF optical metric extensions subTLVs), and b) TE tunnels that have been reported to the Stateful PCE through PCEP extensions described in <draft-ietf-pce-stateful-pce>. Illustratively, TE tunnels that are inserted in the topology are used for Network Guidance computation as direct links (i.e., forwarding adjacencies) in order to include them in all proximity computation/rankings.

Path computation may generally comprise Optical path calculation (PCALC), TE-PCALC, IP-PCALC, and cross connect computations:

Optical PCALC: PCE algorithms are extended to retrieve (e.g., though BGP-LS) optical topology. The use of the optical topology is related to the computation of optical paths (taking into account the requirements expressed in the IP/MPLS layer (Share Risk Link Groups (SRLGs), Delay, etc.).

TE-PCALC: ML-PCE's TE-PCALC algorithm is enriched by the visibility of the optical topology and optical parameters that are known by the ML-PCE (acquired from the optical layer). Part of the optical information is also acquired directly in the IGP thanks to the IGP TE metric extensions noted above (<draft-ietf-ospf-te-metric-extensions> and <draft-previdi-isis-te-metric-extensions>).

IP-PCALC: PCE acts also as an IP Traffic Engineering engine where (similar to TE PCALC) paths are computed taking into account metric extensions (ISIS and OSPF) as well as multilayer topology information.

Cross Connect: When multiple established paths exist in the network (e.g., LSP tunnels, GRE tunnel), the PCE is capable of computing paths including diversity of encapsulation paths. The PCE signals to each endpoint to cross-connect these different paths (e.g., inter-area, inter-AS, etc.) in order to create an end-to-end path.

Regarding APIs (3), a different set of APIs are used by the PCE, as follows:

Northbound APIs: used by PCE clients to request network services (path computation, network guidance, etc.) to the PCE. Examples of northbound APIs are PCEP and ALTO.

Southbound APIs: used by PCE to retrieve information from the multilayer network (e.g., topology and state information) as well as used by the PCE to insert state (e.g., setup an LSP tunnel) into the network. Examples of southbound APIs are: BGP-LS, IGP/BGP protocols, PCEP, etc.

ALTO and PCEP APIs: The ALTO protocol is a standardized version of the NPS/Proximity protocol. ALTO is also capable of distributing virtualized topologies so that the PCE/NPS/ALTO server can pre-compute topologies and network views an distribute these view, using a standardized format, to applications. The PCEP protocol is specified in RFC5440 and extended by <draft-ietf-pce-stateful-pce> so as to allow the PCE to maintain and acquire state from the network. The PCE will maintain a table of existing established LSPs in order to optimize additional LSPs computation as well as re-optimization algorithms. PCEP is used by the PCC for requesting a path and for reporting the path, once established, to the PCE, as well as notifying congestion state, triggering path request redirections, etc.

BGP, BGP-LS, OSPF, ISIS, Flow monitoring processes, etc.: Routing protocols (BGP, IGPs) are used by the PCE in order to acquire topology, resources, and prefix information from each layer. BGP, OSPF, ISIS are used for getting the IGP topology, prefixes (v4 and v6) and resources information (TE and Metric Extension sub-TLVs). BGP-LS is used in order to retrieve multi-area multilevel topologies from the network layer as well as from the optical layer. BGP-LS may also be used to derive application layer topologies (e.g., a content delivery network or "CDN" topology).

Inter-Layer topology distribution: BGP-LS extensions may be used in order to propagate topology information between layers. For example, when the IP layer requires information about the optical layer, it may retrieve optical topology information using the BGP-LS API.

Regarding Inter-PCE Communications (4): Various APIs may be used to allow for efficient inter-PCE communication. For example, a Distributed Stateful PCE Overlay (DSPO) architecture is defined in commonly owned, co-pending U.S. patent application Ser. No. 13/524,071, entitled "Distributed Stateful Path Computation Element Overlay", filed on Jun. 15, 2012 by Previdi et al., which describes a set of protocols and mechanisms through which multiple PCEs can interoperate together and share the load of computations. In particular, as described therein, PCEs may maintain a locally owned tunnel-state table, and joins a distributed hash table (DHT) ring, where the locally owned tunnel-state table is shared with other devices of the DHT ring to establish a DHT-owned tunnel-state table. The PCEs determine ownership of link-state advertisements (LSAs) for a specific portion of a traffic engineering database (TED) according to the DHT ring. As such, when a PCE computes a path for a tunnel using a local TED, the PCE may request permission to use resources along the computed path that were advertised in particular LSAs from owners of those particular LSAs when not owned by the PCE performing the computation.

According to the techniques herein, various use cases may illustrate the functionality of the ML-PCE architecture described herein. For instance, in addition to a Traffic Engineering use case, the following other new cases are addressed by the ML-PCE architecture.

Use Case 1—Information Overlay or "iOverlay":

iOverlay consists of integrating the IP/MPLS layer with the optical (e.g., dense wavelength division multiplexing or "DWDM") layer. In summary, the optical layer shares (advertises) optical path information to the router so that the router knows some of the optical characteristics of the link. From the router side, when the router requests the path to the optical layer, it may specify some of the optical characteristics such as SRLG, disjoint-path, latency, etc. Having the multi-layer-PCE as a central element between the network and optical layers allows the service provider to better leverage and distribute resources in each layer. The ML-PCE is aware of the entire optical topology as well as the set of optical paths that have been signaled/provisioned and can thus efficiently apply re-optimization algorithms when required. Also, it is more efficient to have a global view of each layer within a central component (i.e., the ML-PCE) rather than having each component (e.g., router, switch, reconfigurable optical add-drop multiplexer (ROADM, etc.) having to interoperate between layers.

Use Case 2—NPS/ALTO:

The ML-PCE acquires all of the information about state and topology of each layer of the infrastructure allowing the ML-PCE to have a complete view of the service provider's network (SDN). The service providers may thus leverage ML-PCE knowledge of the network by integrating the ALTO/NPS API so as to allow applications such as CDNs to query the ML-PCE for network guidance. Note that the ML-PCE can also integrate on its ranking algorithm computation, the interoperation between layers.

With specific reference now to FIGS. 3-11H, the architecture of a Multilayer Stateful PCE is defined in order to address the following use cases: MPLS-TE, Optical (iOverlay), MPLS-TE, IP/Generic Tunnels, Service Chaining, NPS/ALTO, etc. Additionally, the different architectural components of the PCE, such as APIs, Databases, Algorithms, Layers, etc., are also defined. Generally, key terms are mentioned below, however certain other terms/objects that appear within FIGS. 3-11H will be understood by those skilled in the art as various processes, data structures, modules, etc., and their illustrative inclusion and connectivity to other processes, data structures, modules, etc., are not meant to limit the embodiments herein.

Figure 3:
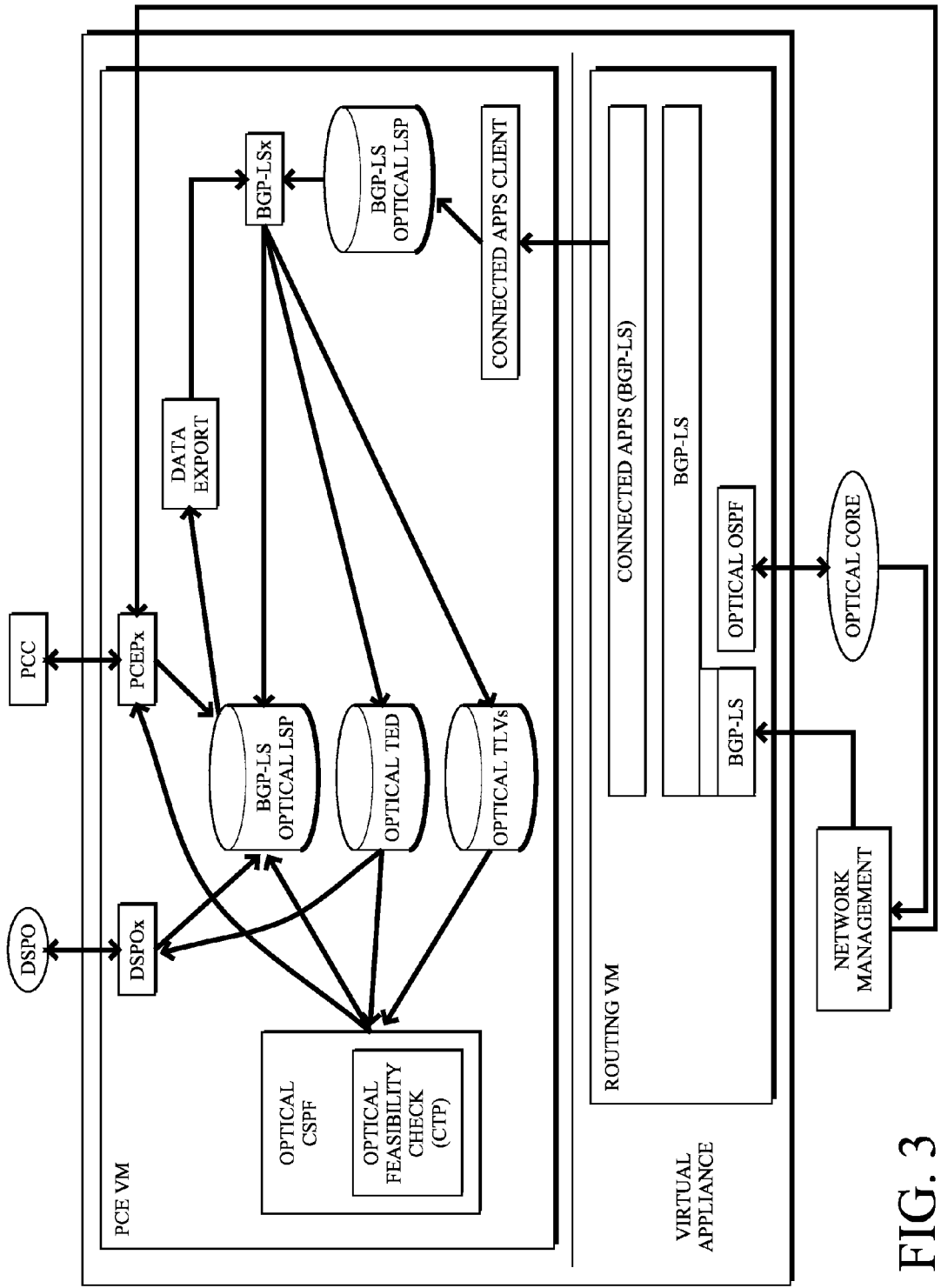
FIG. 3 illustrates an example Path Computation Element (PCE) Architecture and Functional Overview for Optical network information.

FIG. 3 illustrates an example PCE Architecture and Functional Overview for Optical (iOverlay) network information (or, more generally, physical layer information) according to the techniques herein. In general, the ML-PCE may comprise a PCE virtual machine (VM) (e.g., PCE process 248) and a routing VM (e.g., routing process 244), which may interact via network interfaces 210 with various external components, such as other PCEs (e.g., via DSPO), PCCs, the Optical core, and a network management service. In particular, through the architecture's functional overview as shown in FIG. 3, inputs to the system comprise topology obtained and stored in an optical TED, such as from the network management service and IGP (e.g., OSPF) that populate the PCE's knowledge through BGP-LS. Additional input may be obtained through acquisition of static circuits and optical TLV acquisition, such as from the network management service, e.g., populating an Optical LSP Table and Optical TLVs (e.g., as input for Optical Feasibility Checks). Path computation may be performed by the PCE, such as for Optical CSPF, Feasibility Checks, etc., and the output from the PCE in FIG. 3 is an Optical LSP Table (BGP-LS).

Figure 4:
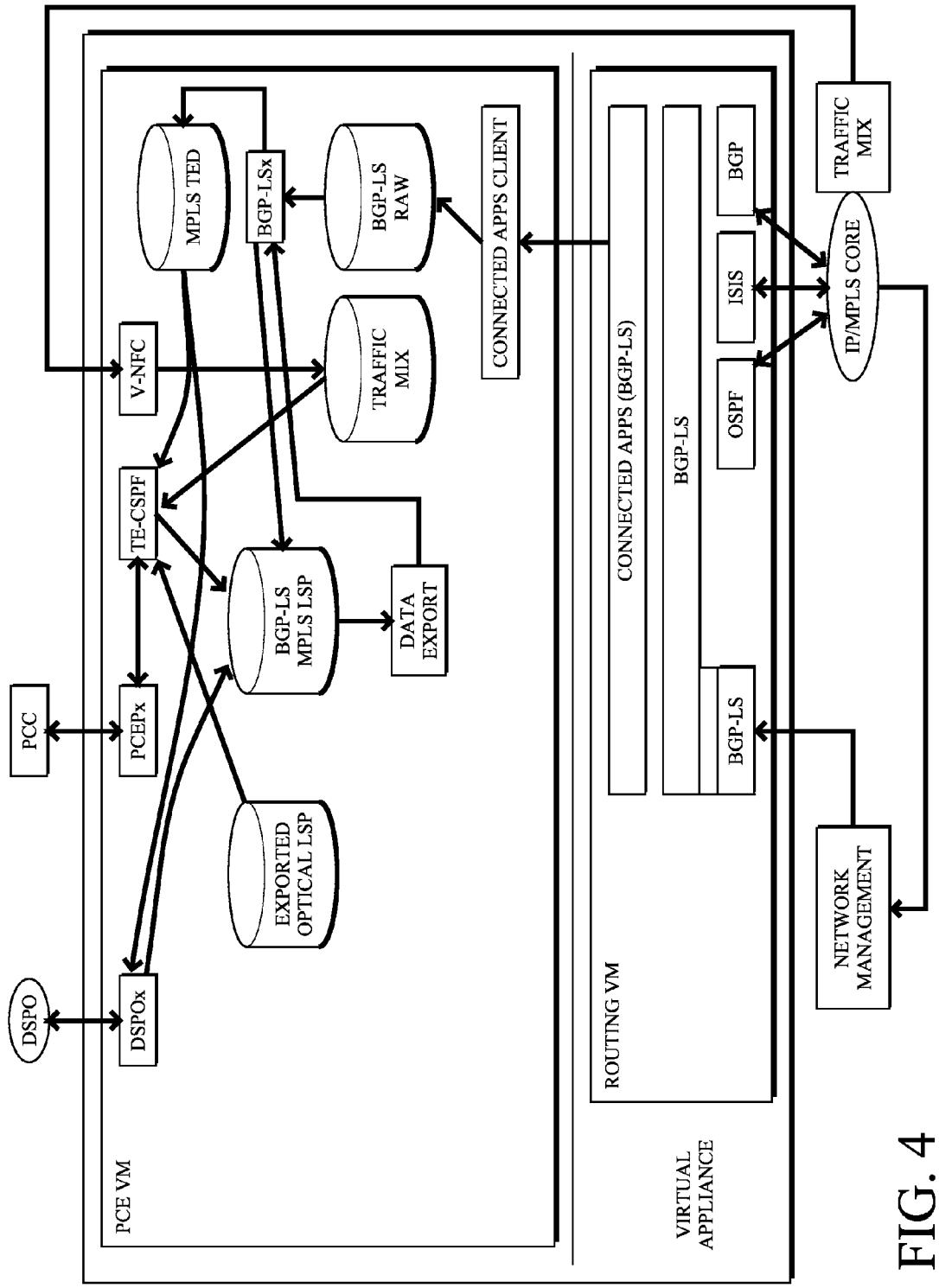
FIG. 4 illustrates an example PCE Architecture and Functional Overview for Traffic Engineering (TE)

FIG. 4 illustrates an example PCE Architecture and Functional Overview for Traffic Engineering (TE) according to the techniques herein. In particular, inputs here are topology acquisition to populate the MPLS TED, which may be populated based on network management services and/or IGP (OSPF/ISIS) protocols, e.g., via the BGP-LS API. In addition, a traffic matrix (e.g., database) may be built based on information from routers in the network, or else from a flow management process of the network management service or the PCE itself. Static LSP tunnel acquisition may also occur to populate an MPLS LSP Table, such that MPLS TE Path Computation (e.g., CSPF) may be performed. An output provided by the view shown in FIG. 4 is an MPLS LSP Table (e.g., BGP-LS).

Figure 5:
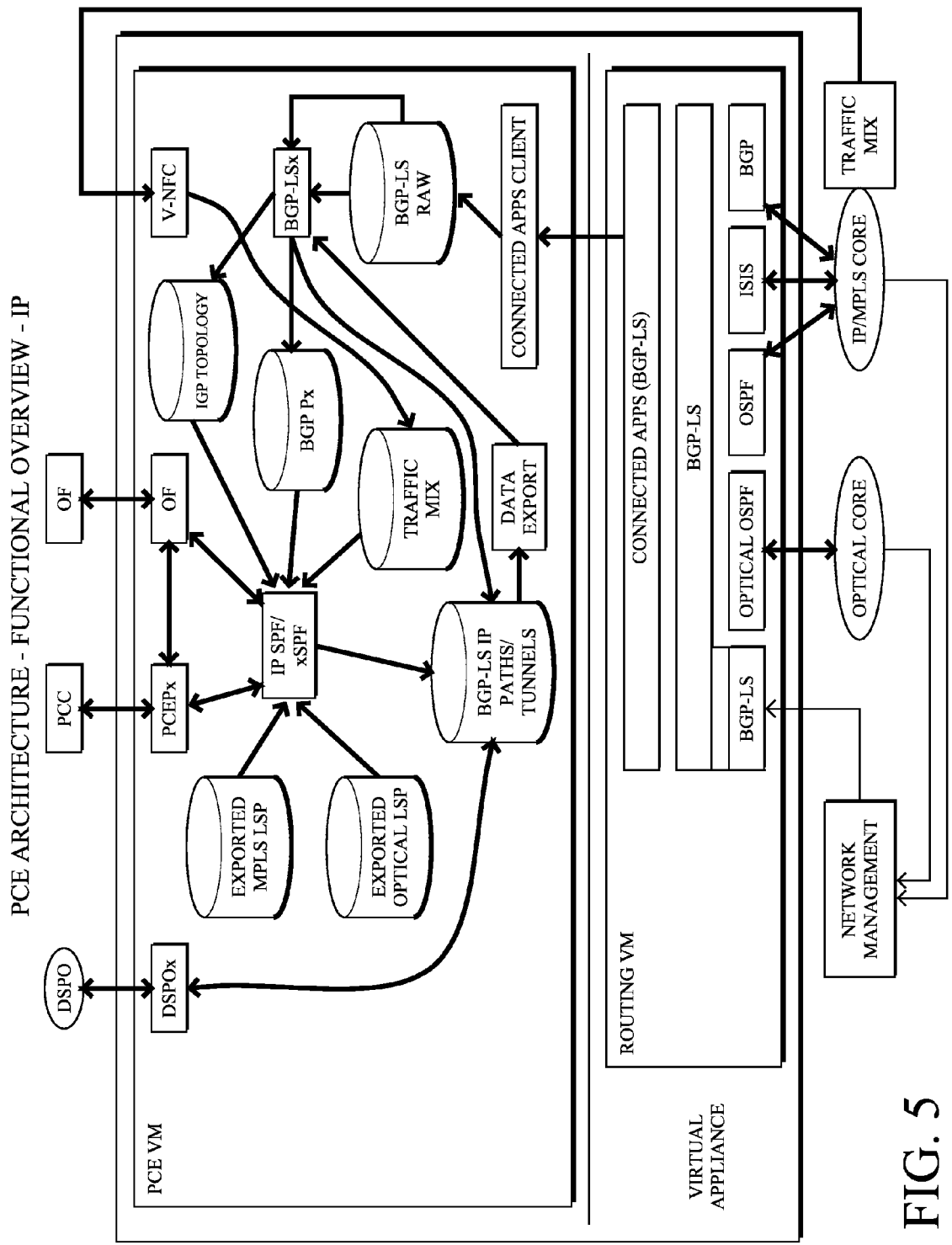
FIG. 5 illustrates an example PCE Architecture and Functional Overview for the Internet Protocol (IP)

FIG. 5 illustrates an example PCE Architecture and Functional Overview for the Internet Protocol (IP) according to the techniques herein. Specifically, inputs in FIG. 5 comprise multi-layer topology acquisition, such as from OSPF/ISIS/BGP and/or network management services (e.g., via BGP-LS) to obtain the IGP Topology and IP Prefixes. A traffic matrix may also be created similarly to FIG. 4, and static IP tunnels may be acquired, such as through network management services to establish an IP tunnel table. Tunnels, generally, may populate an MPLS LSP Table (BGP-LS), as well as an Optical LSP Table (BGP-LS). Path computation in FIG. 5 generally consists of SPF/RSPF computations, and an IP tunnel table may be output (e.g., via BGP-LS).

Figure 6:
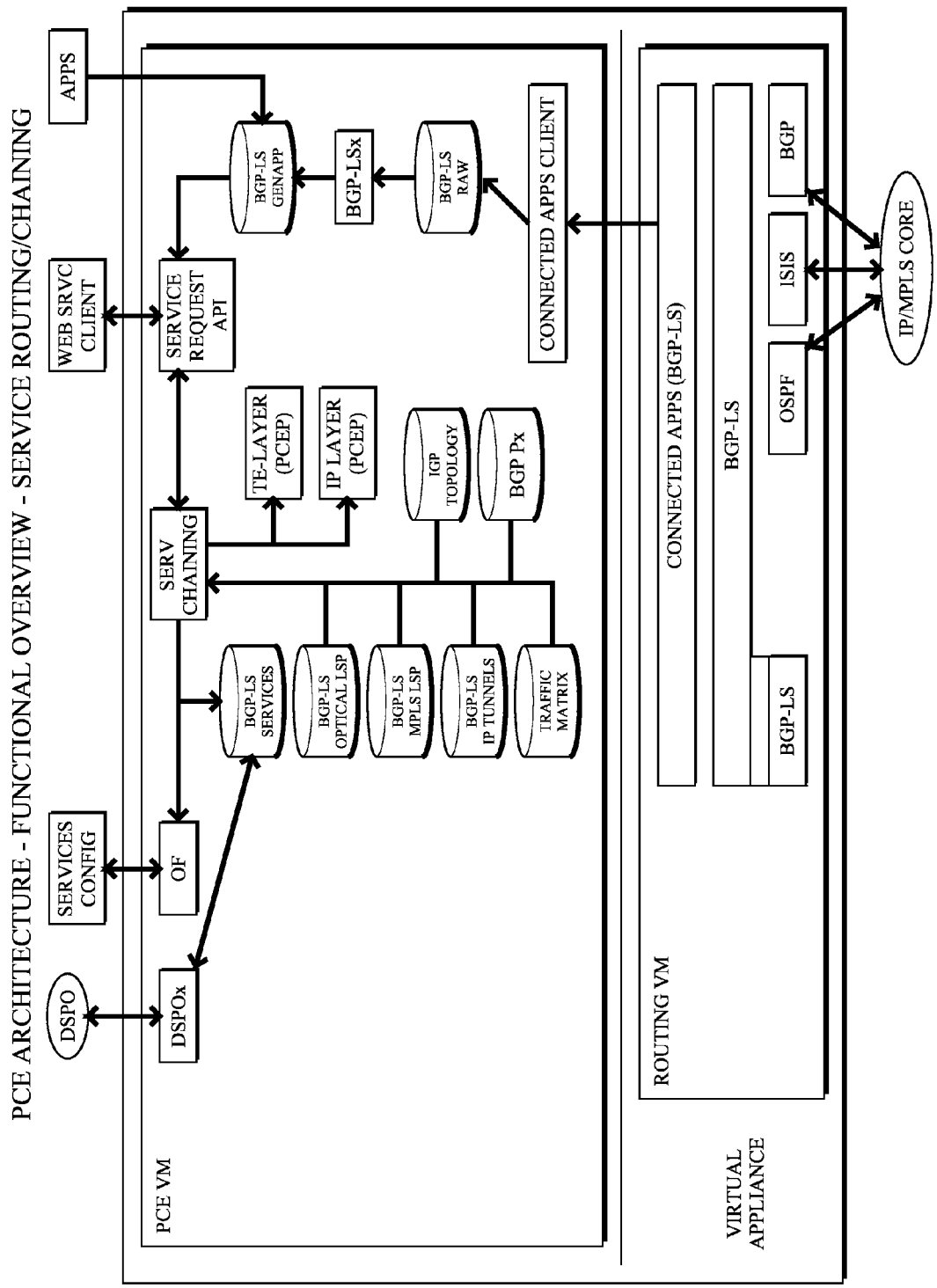
FIG. 6 illustrates an example PCE Architecture and Functional Overview for Service Routing/Chaining.

FIG. 6 illustrates an example PCE Architecture and Functional Overview for Service Routing/Chaining according to the techniques herein. Inputs present in FIG. 6 comprise Service Information Acquisition/Discovery (e.g., from IGP/BGP generic applications, such as according to the protocol described in IETF Internet Draft entitled "Advertising Generic Information in IS-IS" <draft-ietf-isis-genapp-04.txt> for ISIS), as well as topology acquisition and traffic matrix generation as mentioned above. Tunnel management within FIG. 6 comprises an IP Tunnels Table (BGP-LS), MPLS LSP Table (BGP-LS), and Optical LSP Table (BGP-LS). Service Routing/Chaining Computation may be performed in a variety of manners, such as stitching shortest path trees (SPTs), reverse SPTs (RSPTs), etc. A new user API is presented in FIG. 6 that may allow for PCEP access (path computation) and optionally access for the Extensible Messaging and Presence Protocol (XMPP). An output presented in FIG. 6 comprises a Service Chains Table (BGP-LS).

Figure 7:
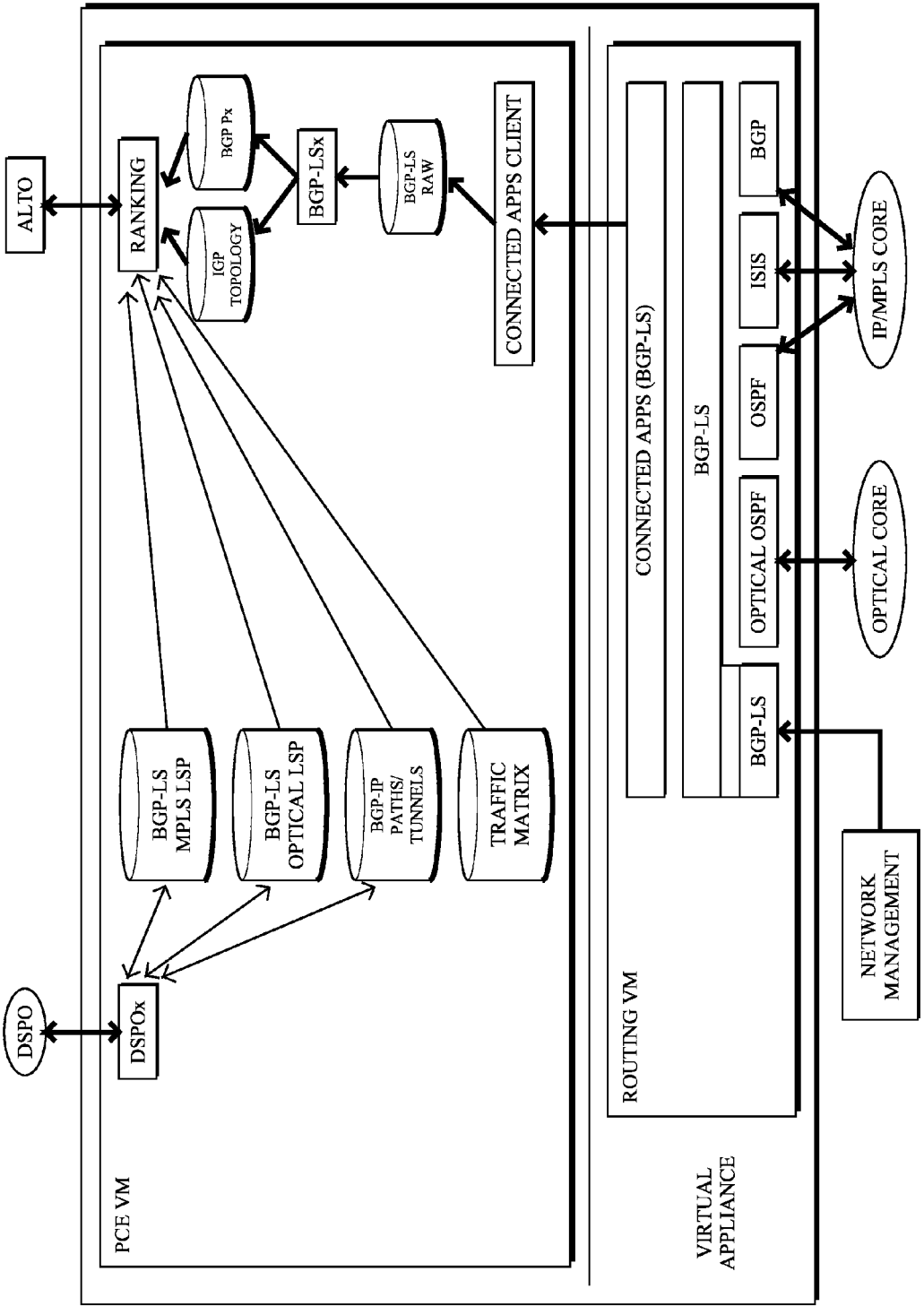
FIG. 7 illustrates an example PCE Architecture and Functional Overview for Network Guidance.

FIG. 7 illustrates an example PCE Architecture and Functional Overview for Network Guidance (e.g., NPS/ALTO) according to the techniques herein. In particular, inputs here comprise multi-layer topology acquisition (e.g., OSPF/ISIS/BGP and/or network management to populate IGP Topology+IP Prefixes), the traffic matrix database, and IP/MPLS/Optical tunnel tables. Computation in FIG. 7 is network guidance computation (e.g., NPS/ALTO), such as ranking algorithms, maps, etc., which then become the outputs provided by the architecture. APIs used in FIG. 7 comprise ALTO, gSOAP (generic XML and Simple Object Access Protocol "SOAP"), etc.

Figure 8:
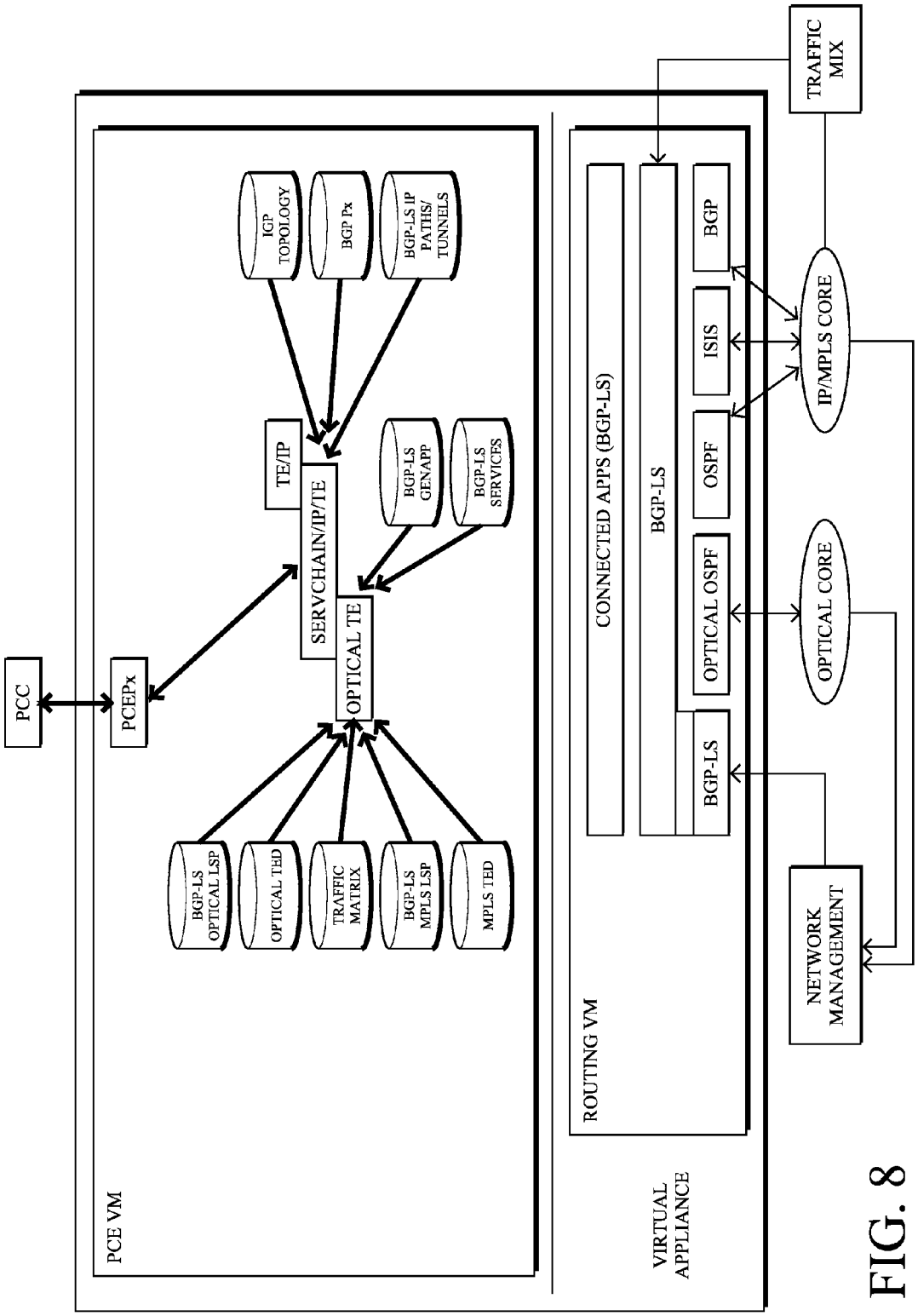
FIG. 8 illustrates an example PCE Architecture and Functional Overview for Multilayer Re-Optimization.

FIG. 8 illustrates an example PCE Architecture and Functional Overview for Multilayer Re-Optimization according to the techniques herein. In particular, FIG. 8 illustrates the flow of topology acquisition (e.g., to establish IGP Topology, IP Prefixes, Optical TED, MPLS TED, etc.) and static/dynamic tunnel acquisition (e.g., Optical Circuits, TE Tunnels, IP Tunnels, etc.). Through the functionality of FIG. 8, various re-optimization algorithms may be performed within the computer network, accordingly.

Figure 9:
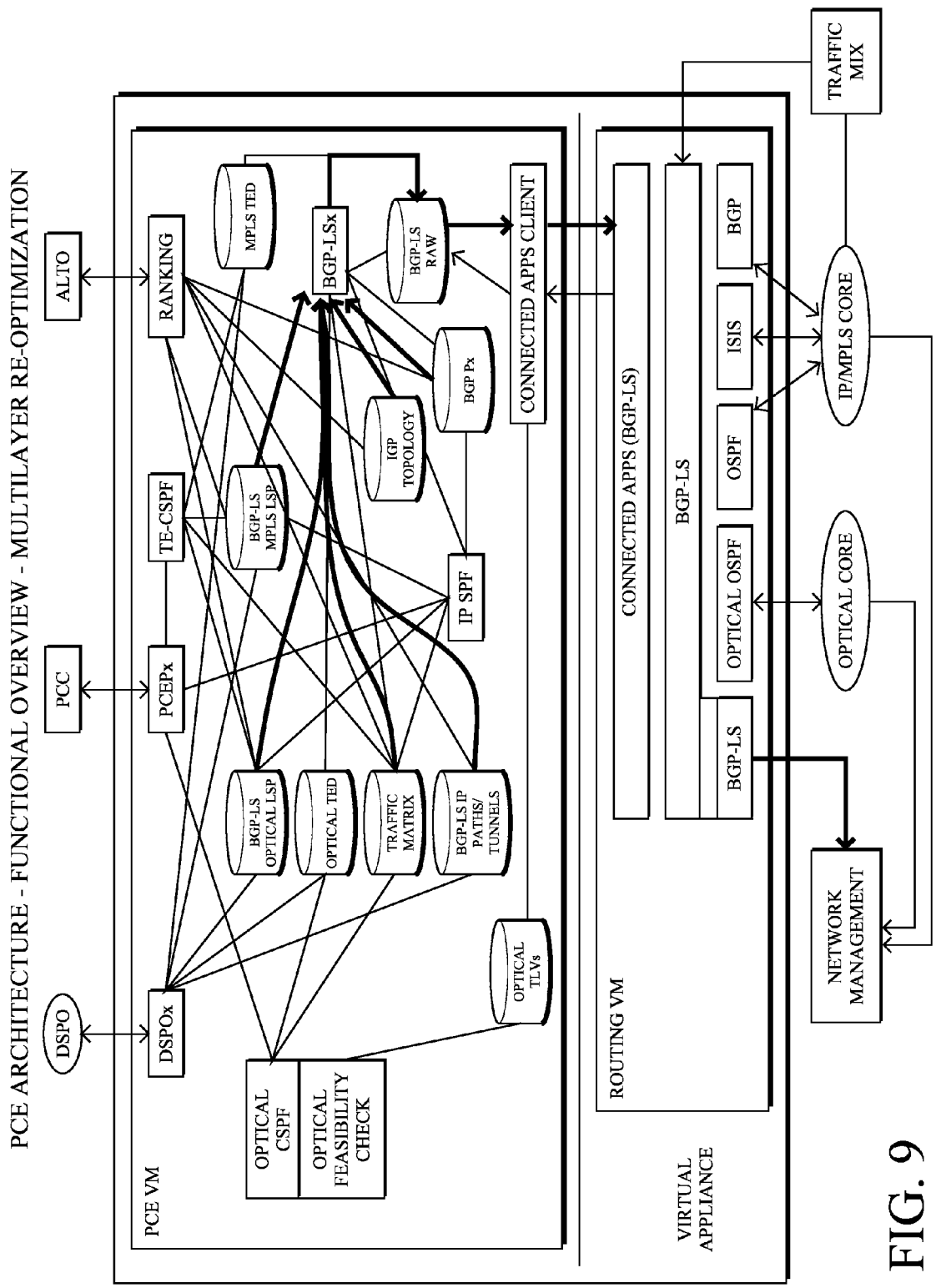
FIG. 9 illustrates an example PCE Architecture and Functional Overview for Visualization.

FIG. 9 illustrates an example PCE Architecture and Functional Overview for Visualization of the architecture according to the techniques herein, generally.

Figure 10A:
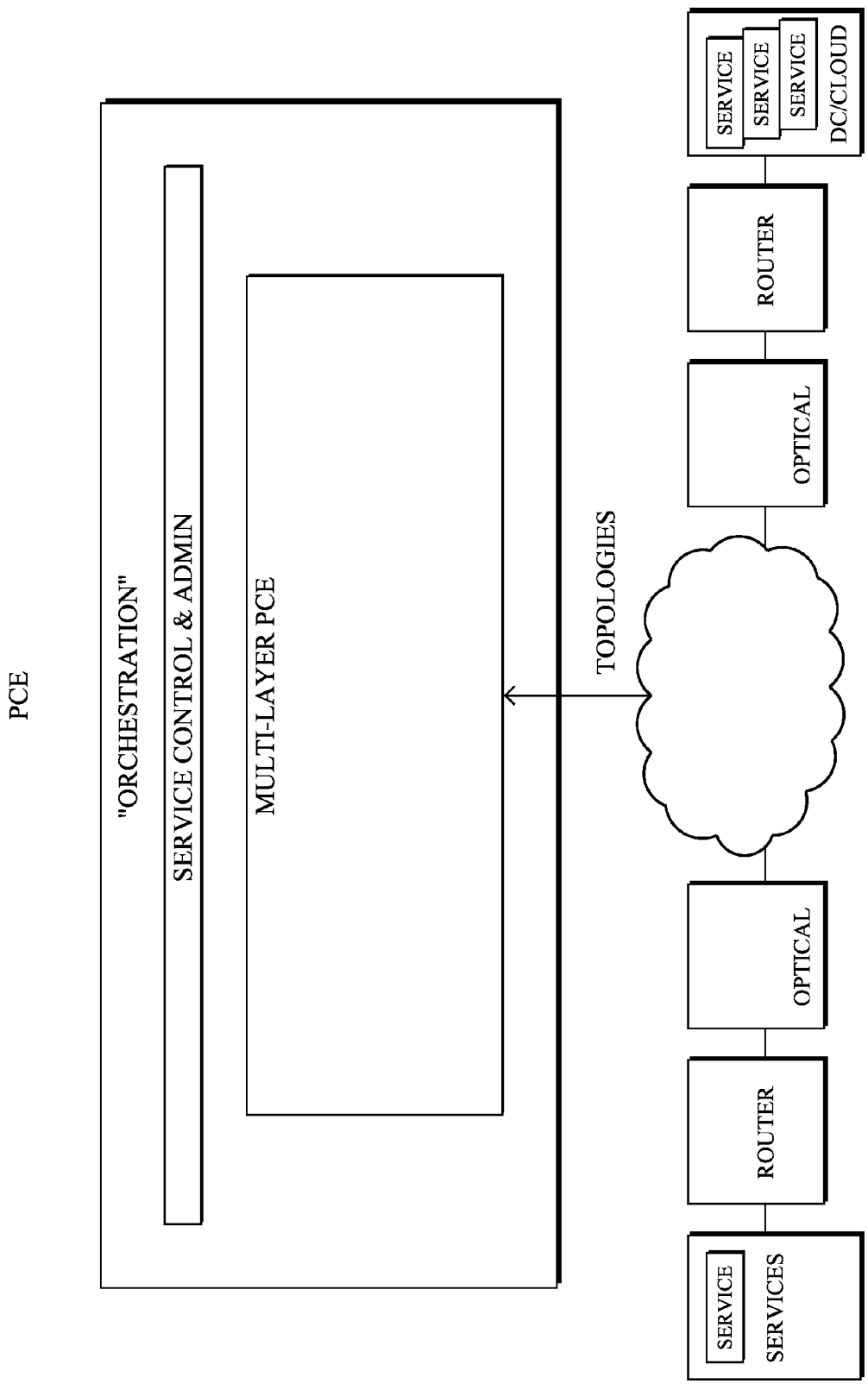
FIGS. 10A-10D illustrate an example multi-layer PCE orchestration.
Figure 10B:
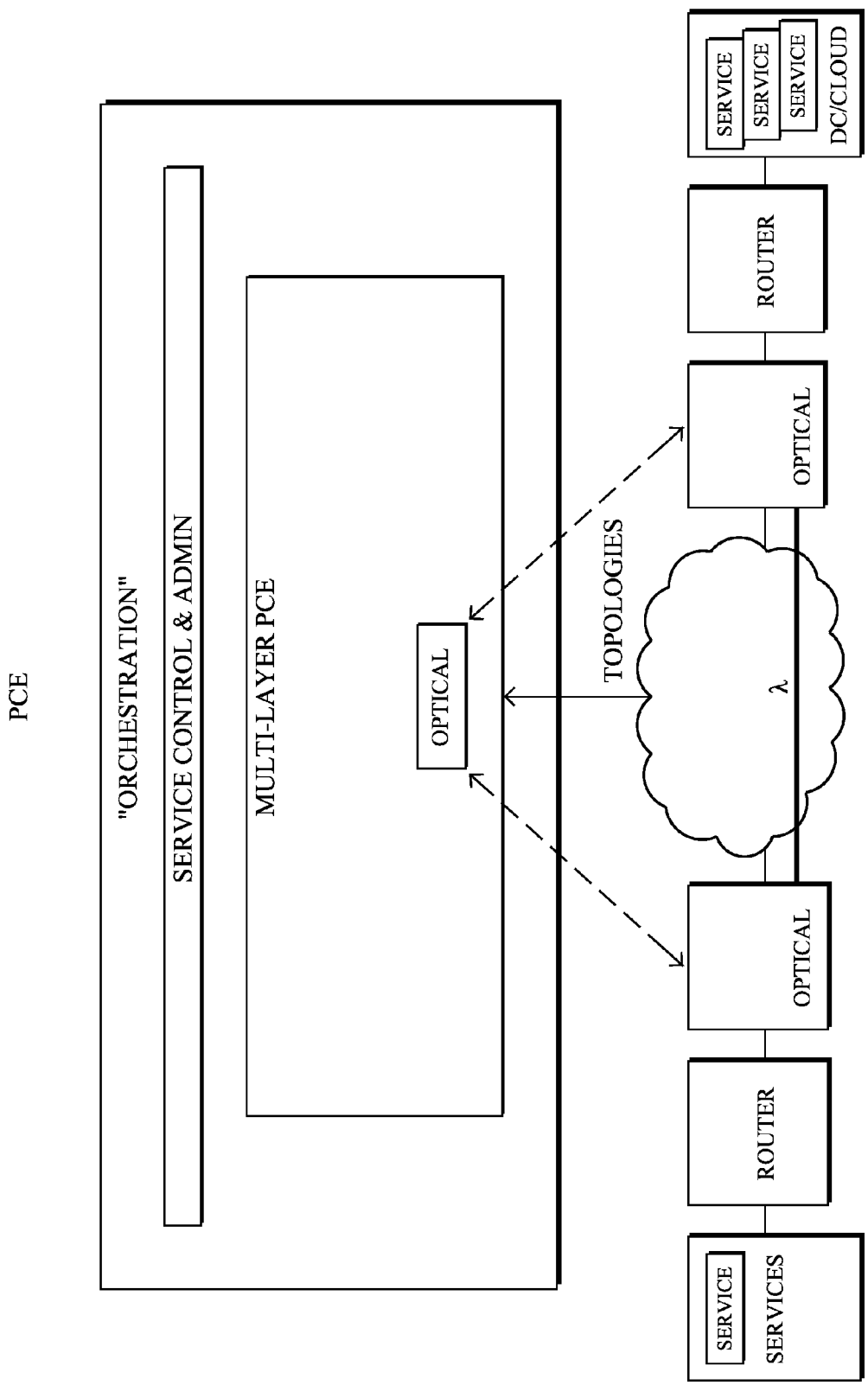
Figure 10C:
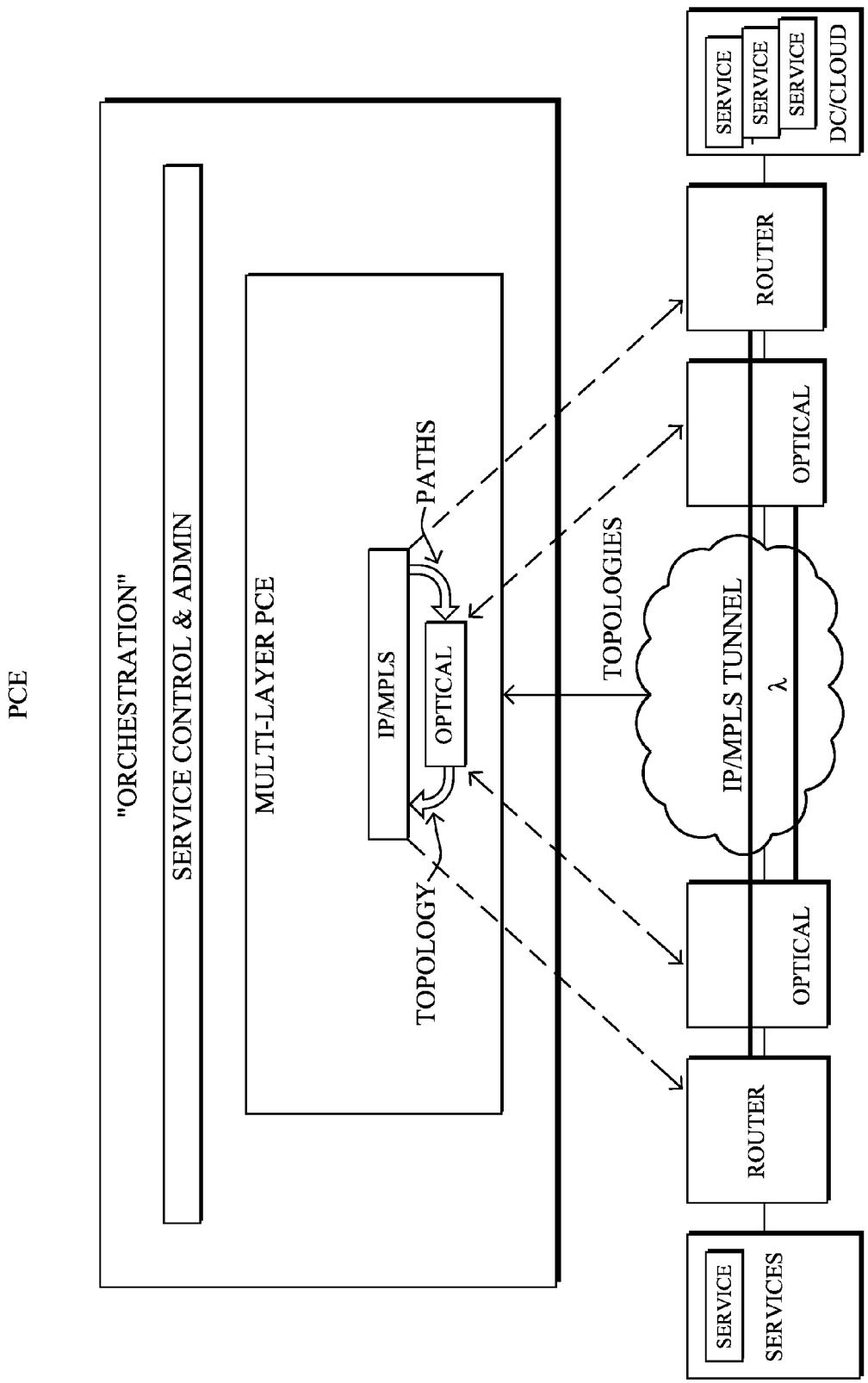
Figure 10D:
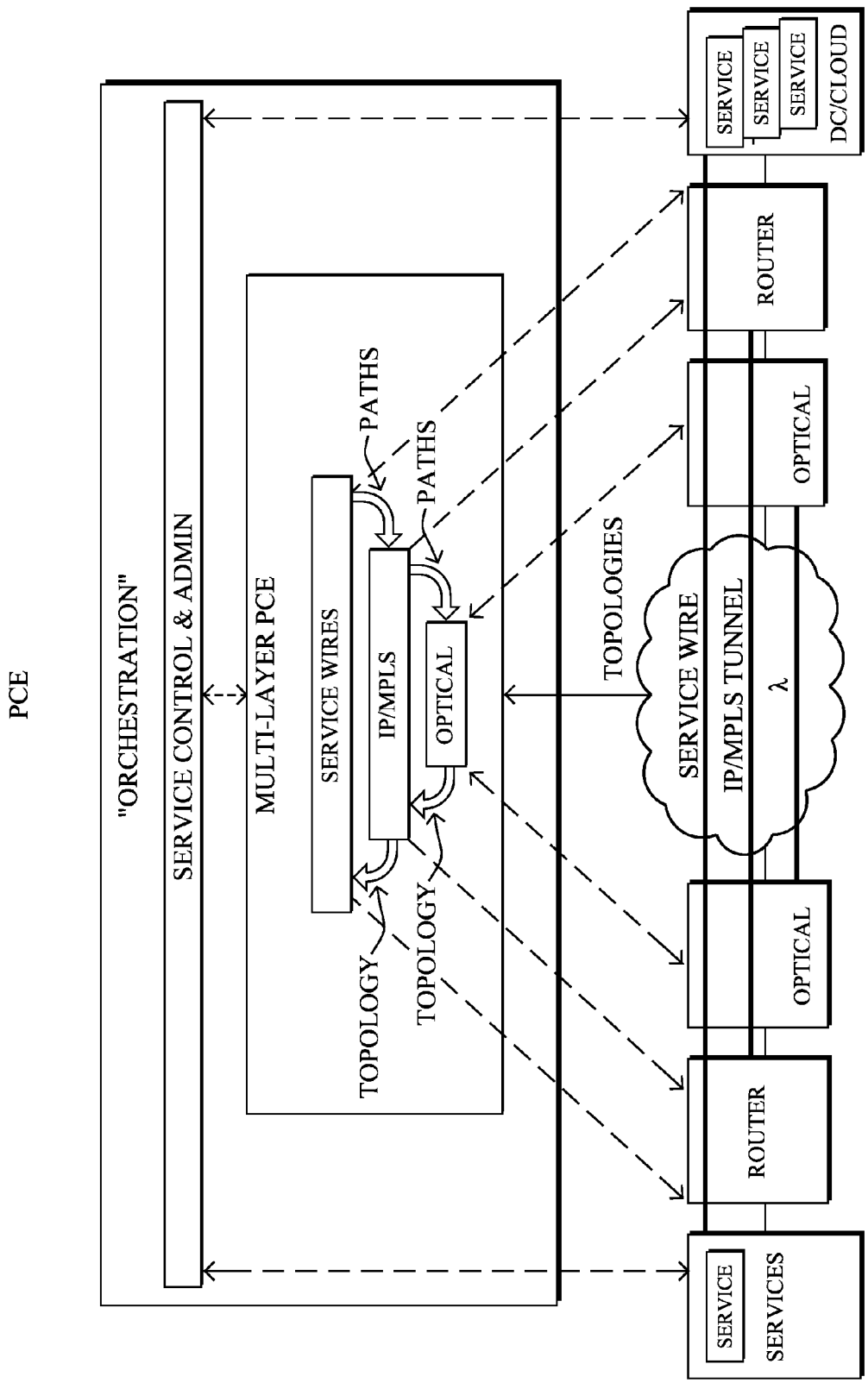
Figure 11A:
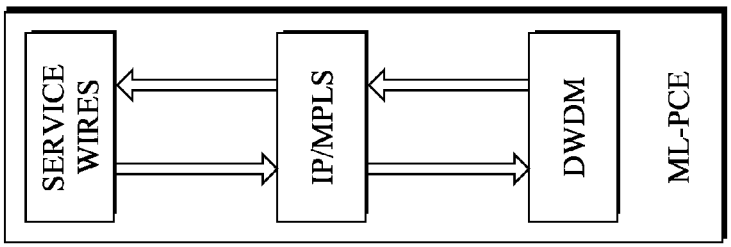
FIGS. 11A-11H illustrate an example service provider software-defined network (SP-SDN) with Multi-Layer Optical overlay.
Figure 11A:
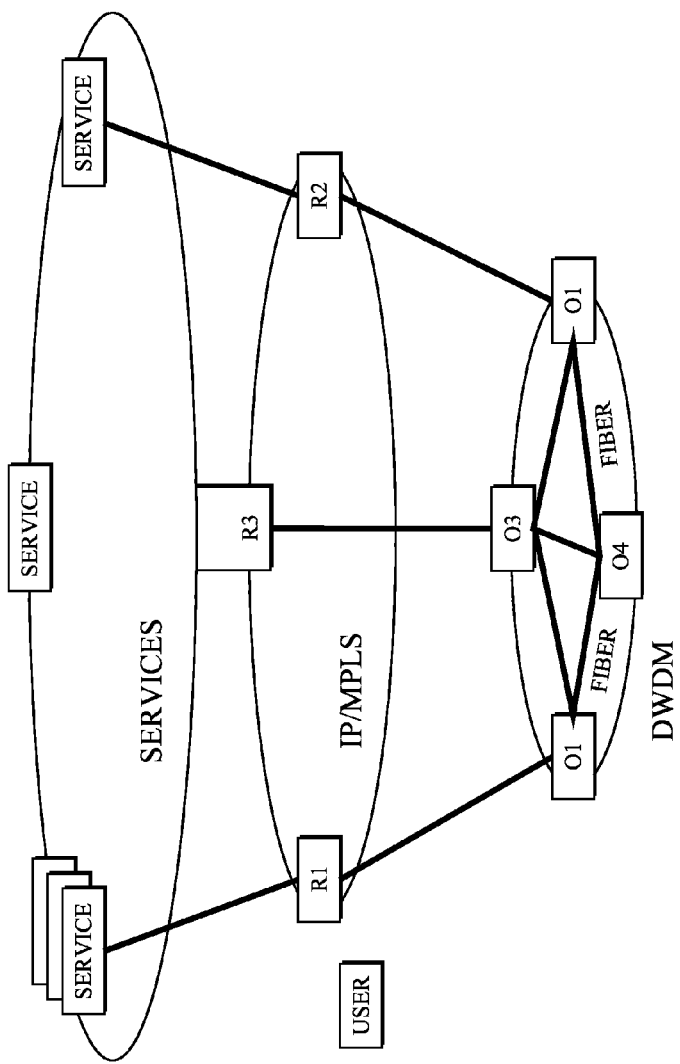
Figure 11B:
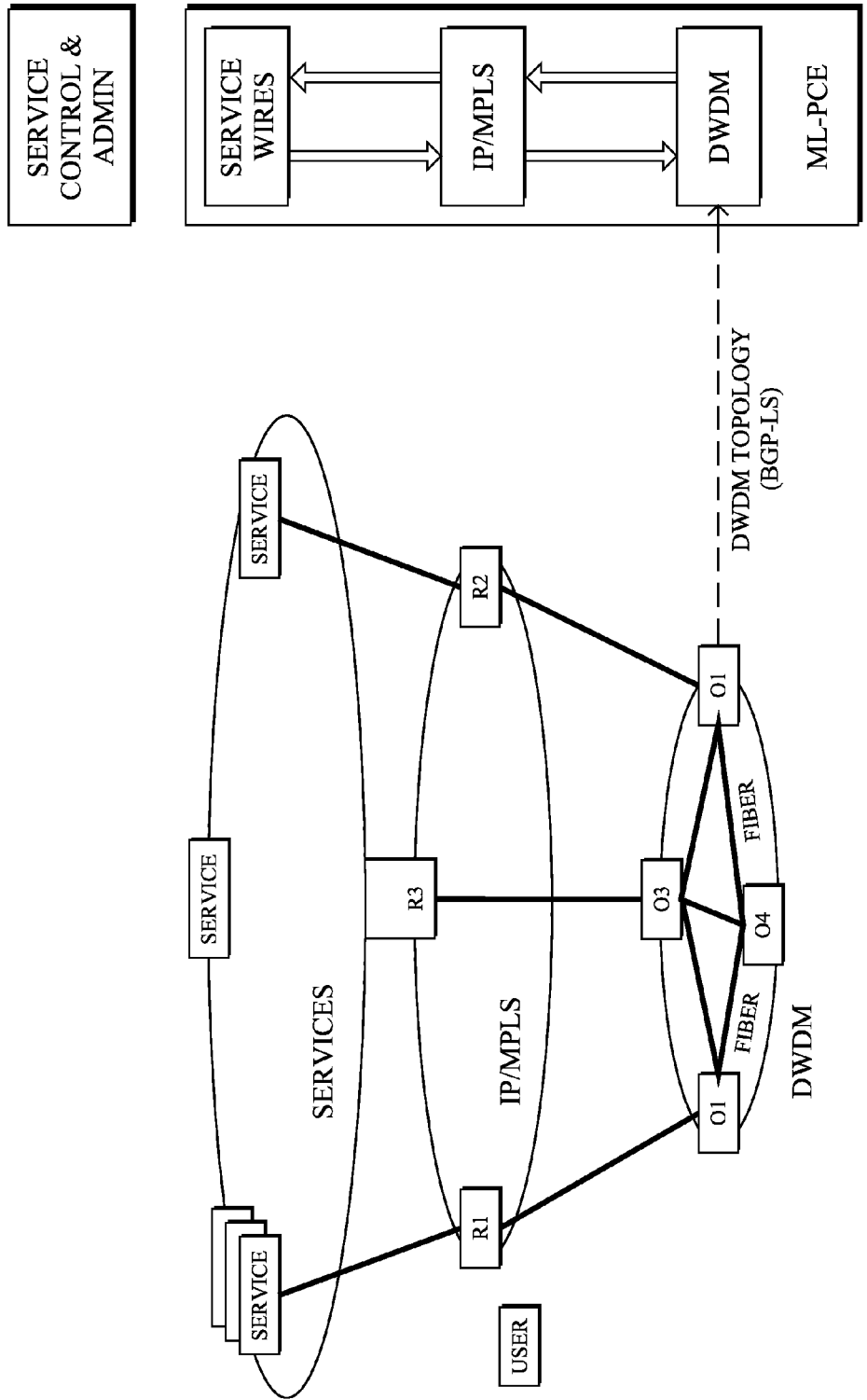
Figure 11C:
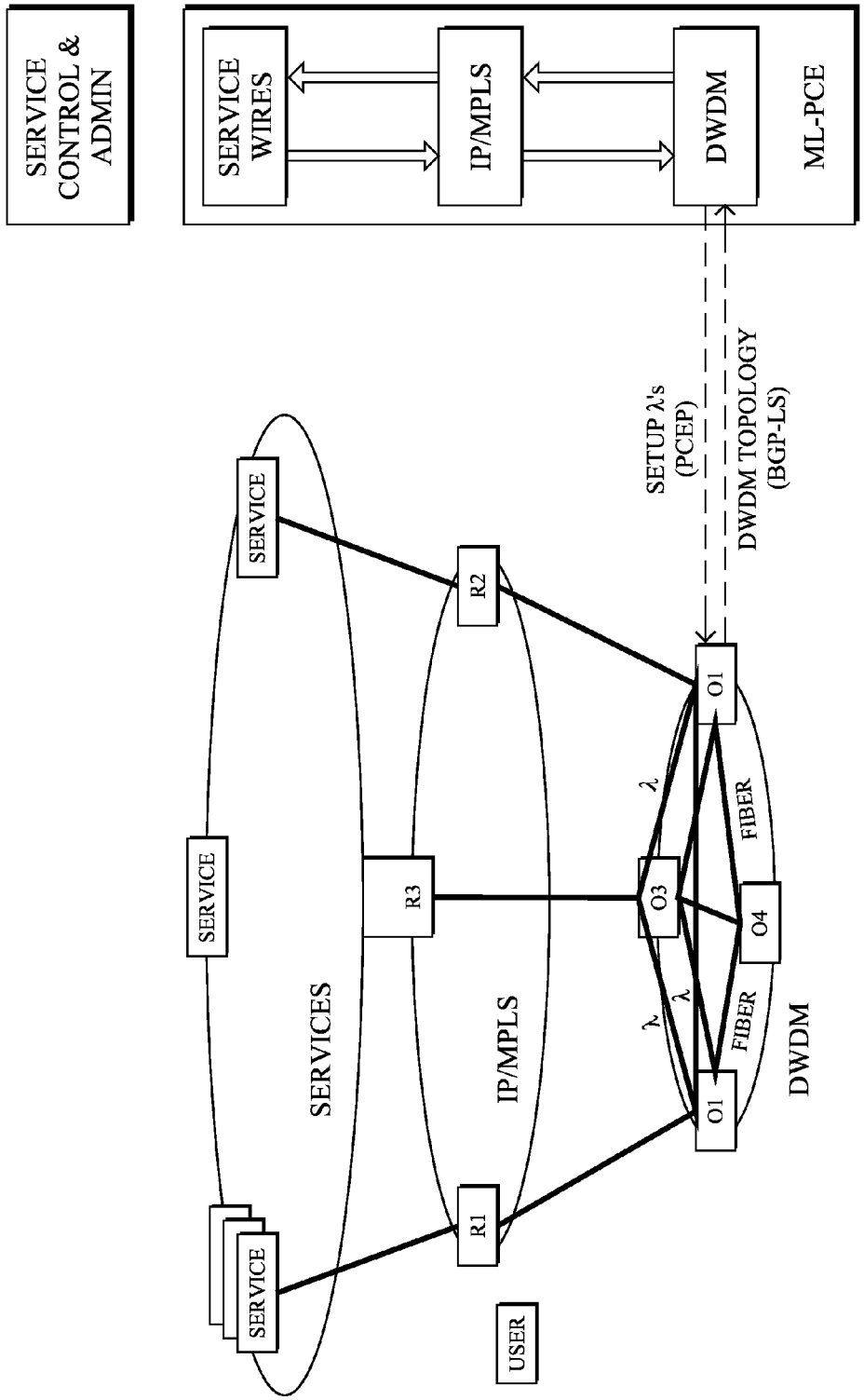
Figure 11D:
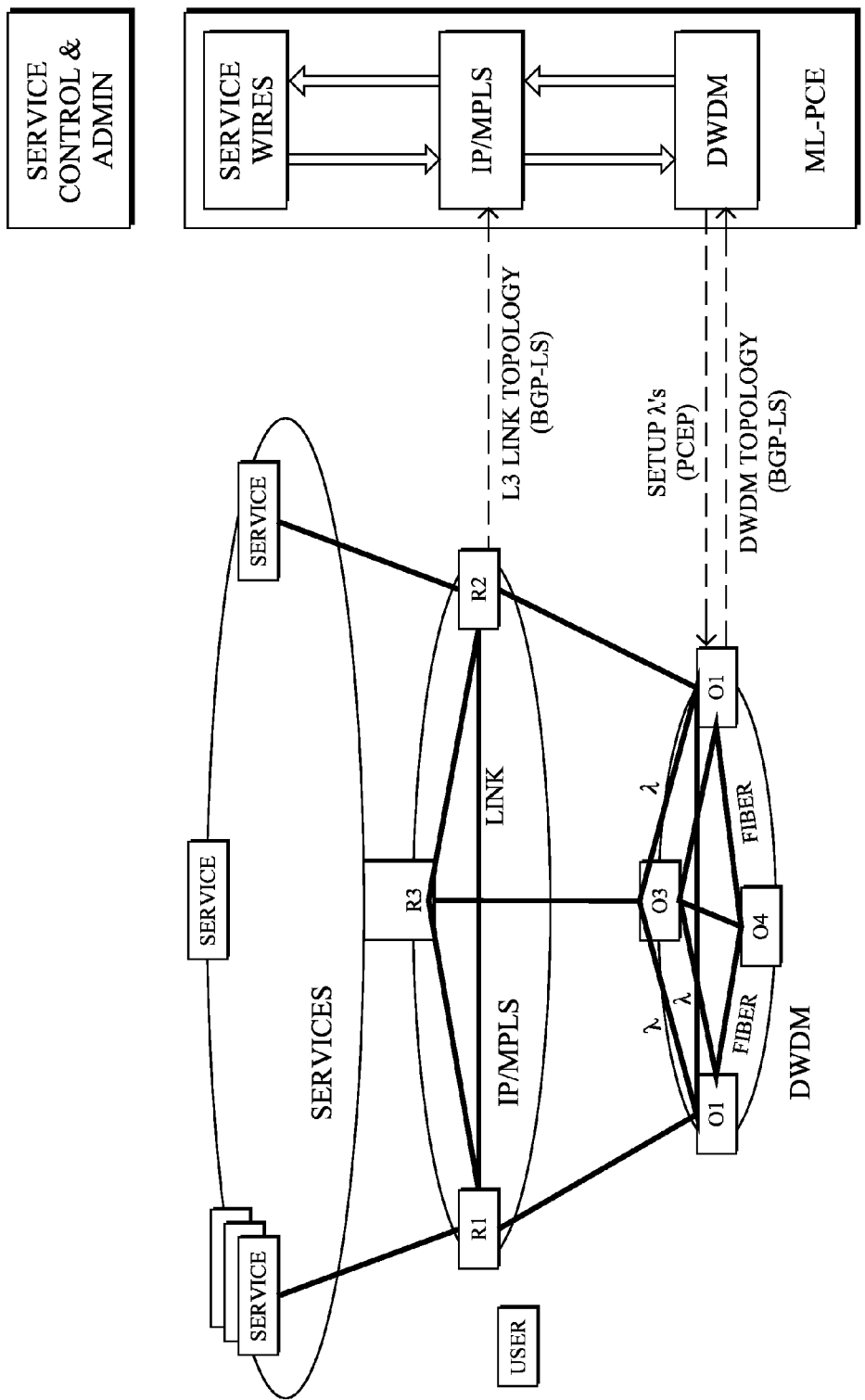
Figure 11E:
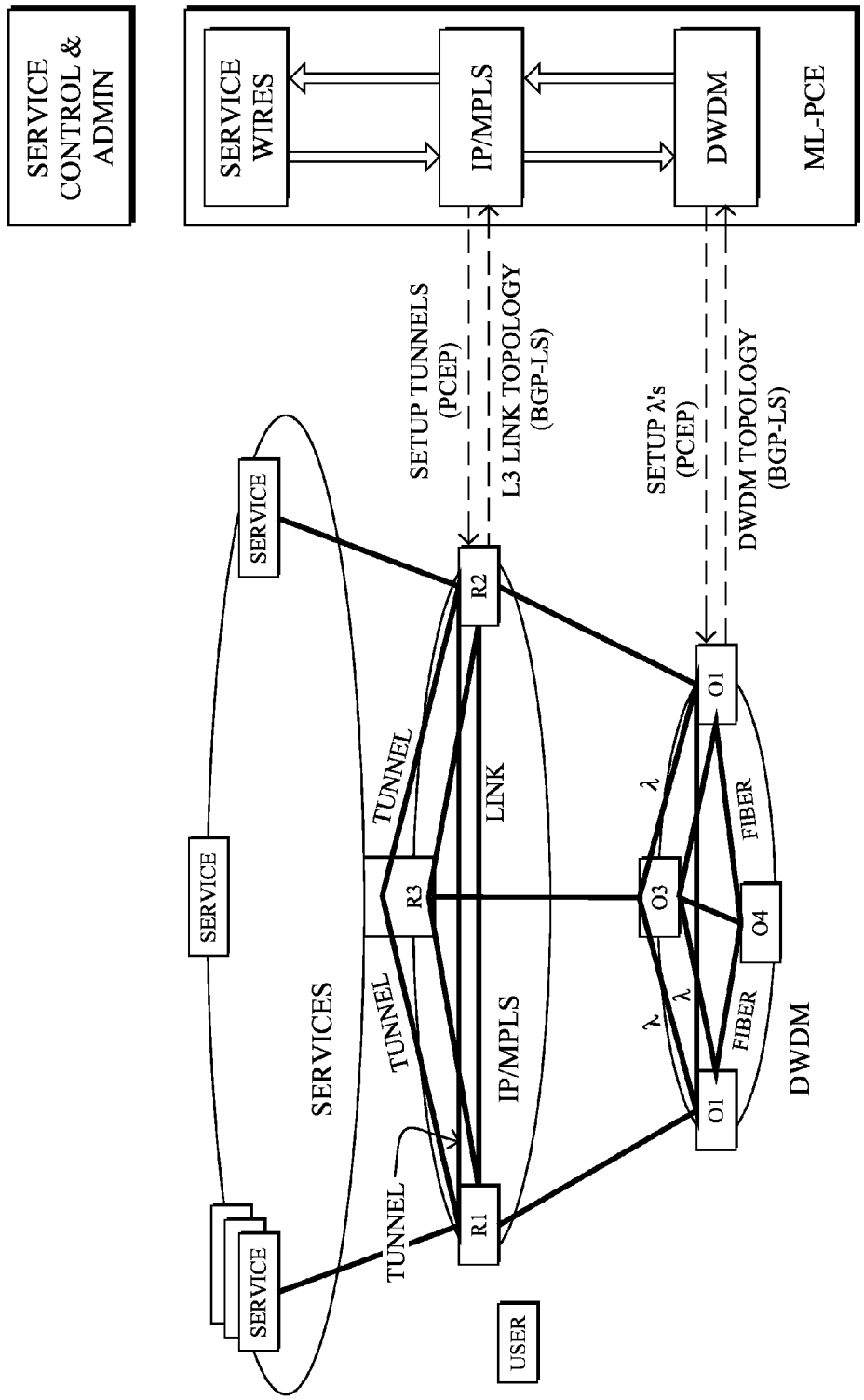
Figure 11F:
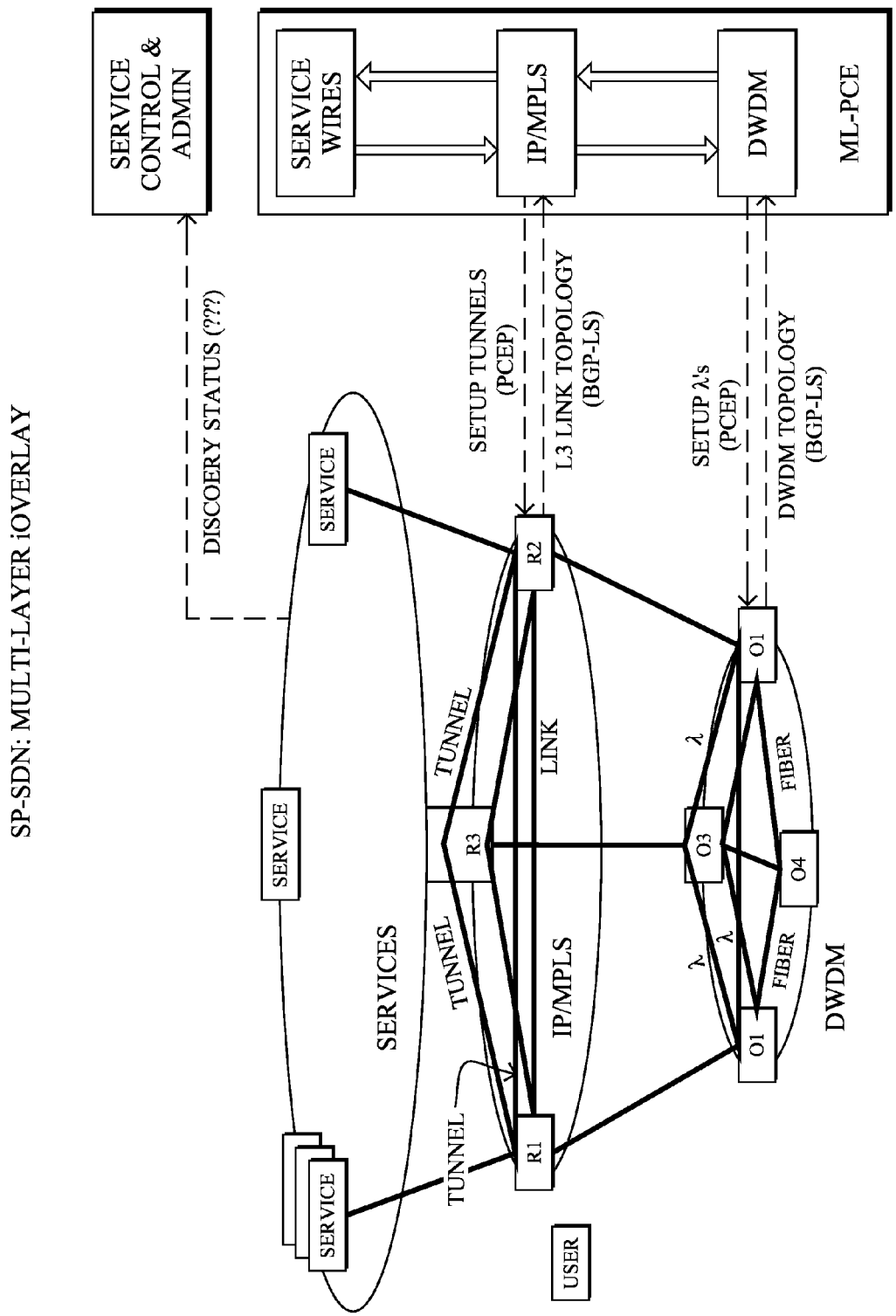
Figure 11G:
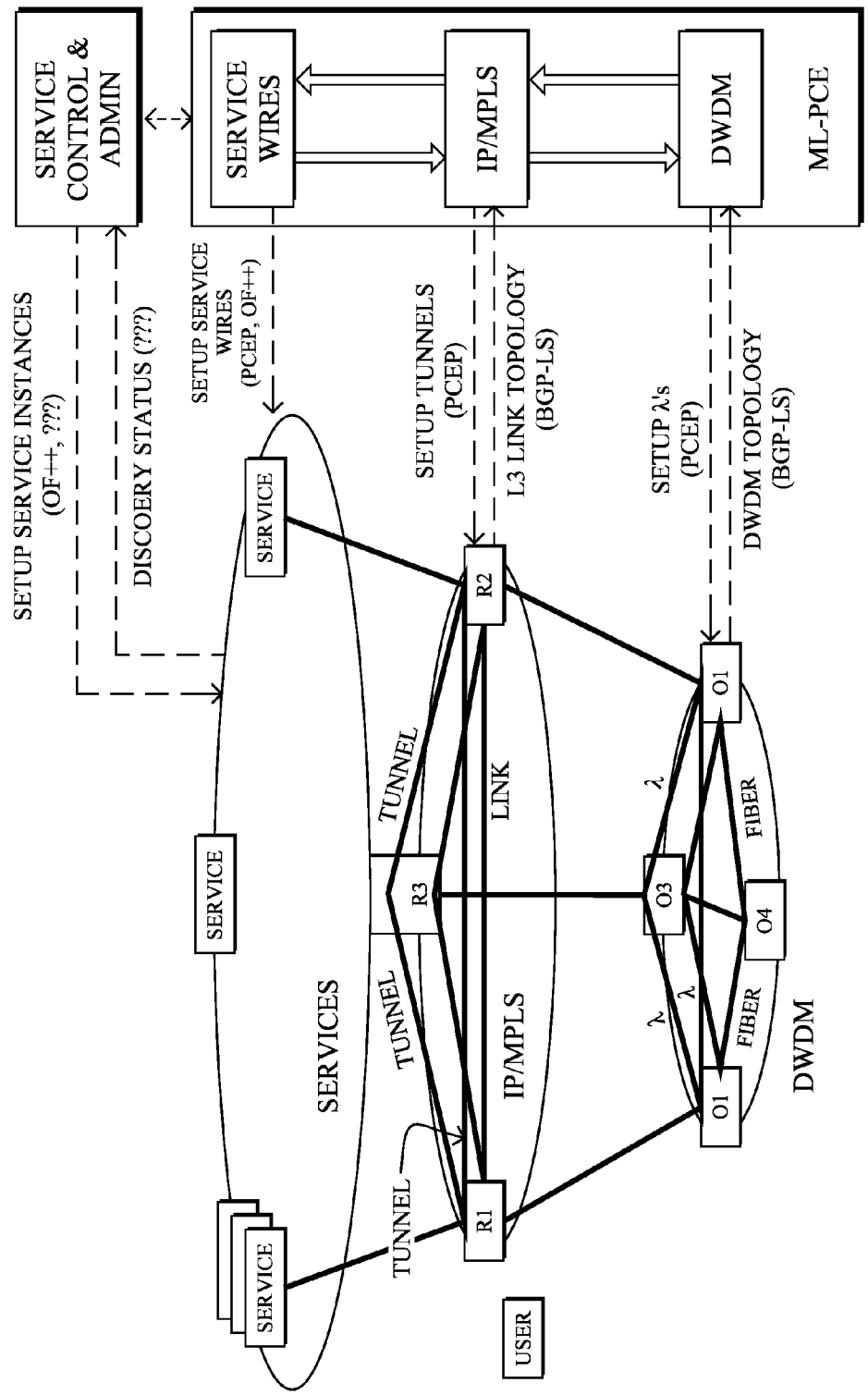
Figure 11H:
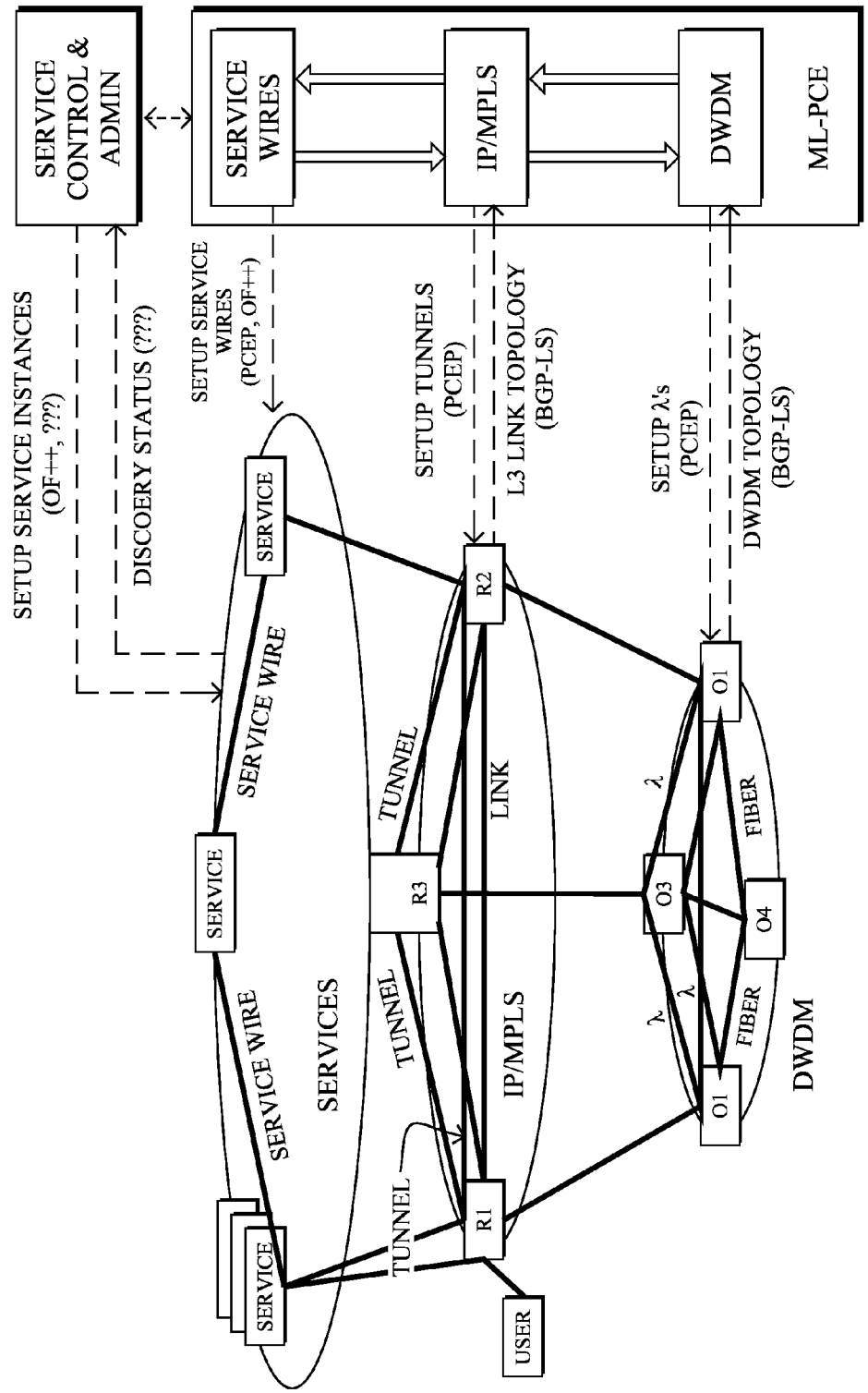

In addition, FIGS. 10A-10D illustrate an example multi-layer PCE orchestration according to the techniques herein. In particular, as shown in FIG. 10A, the services (e.g., generic services, data center/cloud services, etc.) may connect via routers over a physical/optical network, for which the multi-layer PCE oversees. In FIG. 10B, the ML-PCE obtains the optical topologies, which in FIG. 10C may be used with IP/MPLS tunnel information to create paths and further refine the optical topology based on such paths, accordingly. Also, as shown in FIG. 10D, service wires may be integrated by the ML-PCE to further refine the IP/MPLS tunnels, and to manage the wires based on the tunnels, and so on. FIGS. 11A-11H illustrate another example of the service provider software-defined network (SP-SDN) with Multi-Layer Optical overlay according to the techniques herein, and provide an alternative view of (and more details to) FIGS. 10A-10D as will be appreciated by those skilled in the art.

Figure 12:
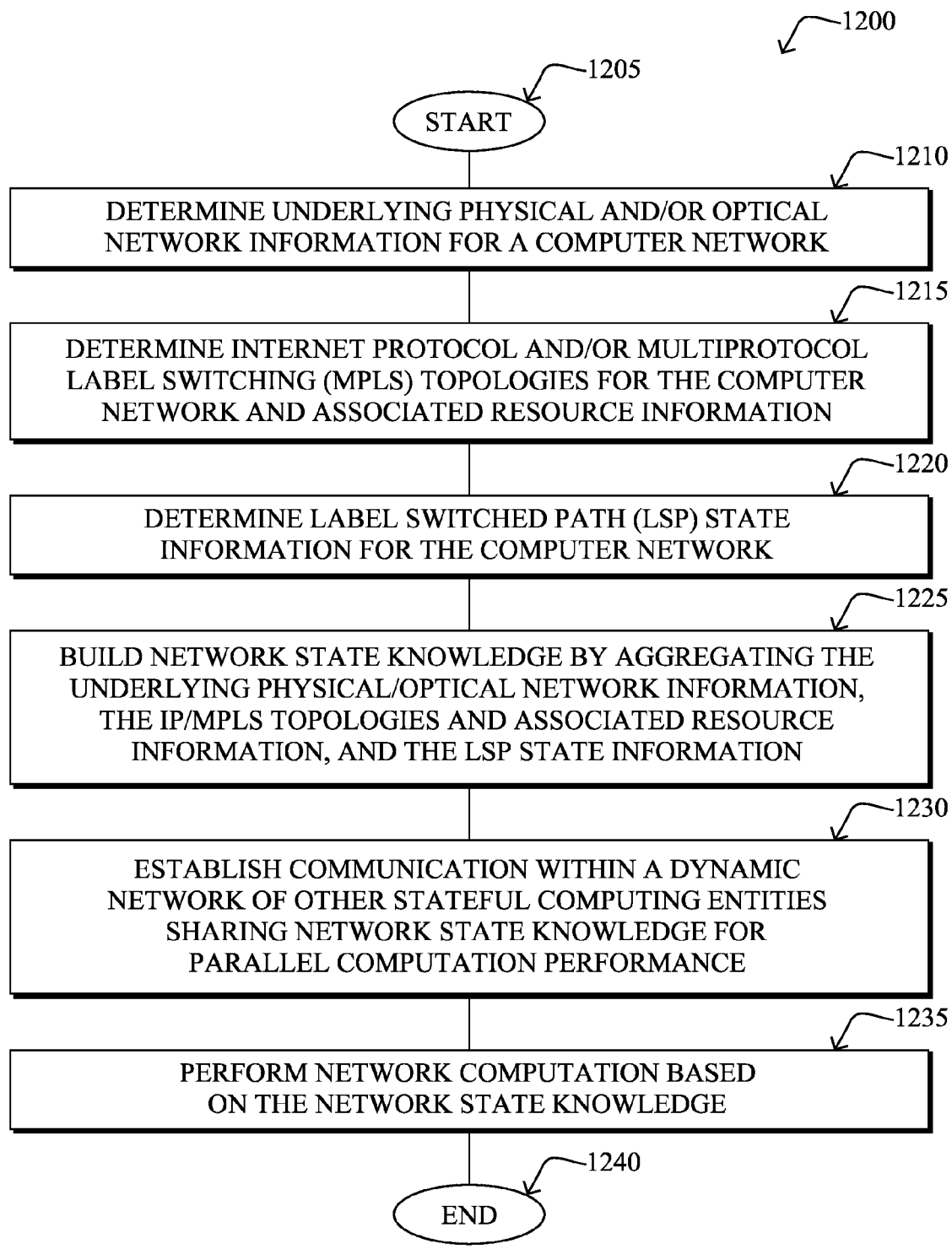
FIG. 12 illustrates an example simplified procedure for providing a multi-layer stateful PCE architecture in a computer network.

FIG. 12 illustrates an example simplified procedure 1200 for providing a multi-layer stateful PCE architecture in a computer network in accordance with one or more embodiments described herein. The procedure 1200 may start at step 1205, and continues to step 1210, where, as described in greater detail above, a stateful computation entity (e.g., PCE) determines underlying physical and/or optical network information for a computer network, such as an SDN. For instance, as described above, determining underlying physical/optical network information may comprise communicating IGP TE metric extensions in a network layer of the computer network, and/or connecting to a GMPLS-OSPF domain, among other techniques. In addition, in step 1215, the stateful computation entity may determine IP/MPLS topologies for the computer network and associated resource information, such as by accessing APIs for IGP/BGP routing protocols to obtain end-to-end topologies and resource information. Furthermore, in step 1220, the stateful computation entity may determine LSP state information for the computer network, such as by obtaining state information about established LSPs from each LSP head-end device in the computer network.

In step 1225, the stateful computation entity may build network state knowledge by aggregating the underlying physical/optical network information, the IP/MPLS topologies and associated resource information, and the LSP state information, and in step 1230 also establishes communication within a dynamic network of other stateful computing entities sharing network state knowledge for parallel computation performance. Accordingly, in step 1235, the stateful computation entity may perform network computation based on the network state knowledge. For example, such network computation may be for network guidance computation and/or path computation, as described above. For instance, network guidance computation may comprise ALTO computation and/or NPS computation, while path computation may comprise multi-encapsulation cross connect computation, optical path computation, TE path calculation, IP path calculation, application routing computation, etc. The procedure 1200 ends in step 1240, though notably with the option to dynamically update any information at any step, and to perform further computations.

It should be noted that while certain steps within procedure 1200 may be optional as described above, the steps shown in FIG. 12 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for a multi-layer stateful PCE architecture in a computer network. In particular, the techniques herein allow computing entities (e.g., PCE servers) to integrate different information sources in the network infrastructure so as to deliver optimal network services, such as network guidance, traffic and demand engineering, as well as application (video/content) routing. For instance, the techniques herein provide a stateful PCE architecture that considers multi-layer information from the physical layer up to the tunnels themselves, all at once, and in a shared manner, to perform optimal computations.

While there have been shown and described illustrative embodiments that provide a multi-layer stateful PCE architecture in a computer network, it is to be understood that various other adaptations and modifications may be made within the spirit and scope of the embodiments herein. For example, the embodiments have been shown and described herein with relation to various specific protocols, such as MPLS, GMPLS, ALTO, IGP/BGP implementations, etc. However, the embodiments in their broader sense are not as limited, and may, in fact, be used with any suitable protocol for the respective layers. Also, while determining underlying physical/optical network information has been generally described to comprise connecting to a GMPLS-OSPF domain, other embodiments such as ISIS, SNMP, etc., may also be possible in accordance with the techniques herein.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   determining underlying network information for a computer network, the underlying network information comprising at least one of either physical and optical network information;
   determining topologies for the computer network and associated resource information, the topologies comprising at least one of either Internet Protocol (IP) and Multi-protocol Label Switching (MPLS) topologies;
   determining label switched path (LSP) state information for the computer network;
   building network state knowledge by aggregating the underlying network information, the topologies and associated resource information, and the LSP state information, wherein the network state knowledge is an aggregation of the underlying network information, the topologies and associated resource information, and the LSP state information;
   establishing communication within a dynamic network of other stateful computing entities sharing network state knowledge for parallel computation performance; and
   performing network computation based on the network state knowledge.

2. The method as in claim 1, wherein determining underlying physical/optical network information comprises:
   communicating interior gateway protocol (IGP) traffic engineering (TE) metric extensions in a network layer of the computer network.

3. The method as in claim 1, wherein determining underlying physical/optical network information comprises:
   connecting to a generalized MPLS (GMPLS)-Open Shortest Path First (OSPF) domain.

4. The method as in claim 1, wherein determining IP/MPLS topologies and associated resource information comprises:
   accessing application programming interfaces (APIs) for interior gateway protocol (IGP) and/or border gateway protocol (BGP) routing protocols to obtain end-to-end topologies and resource information.

5. The method as in claim 1, wherein determining LSP state information comprises:
   obtaining from each LSP head-end device in the computer network state information about established LSPs.

6. The method as in claim 1, wherein performing network computation based on the network state knowledge comprises one of either network guidance computation or path computation.

7. The method as in claim 6, wherein performing network guidance computation comprises application layer traffic optimization (ALTO) computation and/or network positioning system (NPS) computation.

8. The method as in claim 6, wherein performing path computation comprises multi-encapsulation cross connect computation.

9. The method as in claim 6, wherein performing path computation comprises optical path computation.

10. The method as in claim 6, wherein performing path computation comprises traffic engineering (TE) path calculation.

11. The method as in claim 6, wherein performing path computation comprises IP path calculation.

12. The method as in claim 6, wherein performing path computation comprises application routing computation.

13. The method as in claim 1, wherein the computer network comprises a software defined network (SDN).

14. The method as in claim 1, wherein the stateful computing entities are path computation elements (PCEs).

15. An apparatus, comprising:
   one or more network interfaces to communicate within a computer network;
   a processor coupled to the network interfaces and adapted to execute one or more processes; and
   a memory configured to store a stateful computing entity process executable by the processor, the process when executed operable to:
      determine underlying network information for the computer network, the underlying network information comprising at least one of either physical and optical network information;
      determine topologies for the computer network and associated resource information, the topologies comprising at least one of either Internet Protocol (IP) and Multiprotocol Label Switching (MPLS) topologies;
      determine label switched path (LSP) state information for the computer network;

build network state knowledge by aggregating the underlying network information, the topologies and associated resource information, and the LSP state information, wherein the network state knowledge is an aggregation of the underlying network information, the topologies and associated resource information, and the LSP state information;

establish communication within a dynamic network of other stateful computing entities sharing network state knowledge for parallel computation performance; and perform network computation based on the network state knowledge.

16. The apparatus as in claim 15, wherein the process when executed to determine underlying physical/optical network information is further operable to:

communicate interior gateway protocol (IGP) traffic engineering (TE) metric extensions in a network layer of the computer network.

17. The apparatus as in claim 15, wherein the process when executed to determine underlying physical/optical network information is further operable to:

connect to a generalized MPLS (GMPLS)-Open Shortest Path First (OSPF) domain.

18. The apparatus as in claim 15, wherein the process when executed to determine IP/MPLS topologies and associated resource information is further operable to:

access application programming interfaces (APIs) for interior gateway protocol (IGP) and/or border gateway protocol (BGP) routing protocols to obtain end-to-end topologies and resource information.

19. The apparatus as in claim 15, wherein the process when executed to determine LSP state information is further operable to:

obtain from each LSP head-end device in the computer network state information about established LSPs.

20. The apparatus as in claim 15, wherein the process when executed to perform network computation based on the network state knowledge is further operable to perform one of either network guidance computation or path computation.

21. A system, comprising:

a plurality of stateful computing entities in a computer network, each stateful computing entity configured to:

determine underlying network information for the computer network, the underlying network information comprising at least one of either physical and optical network information;

determine topologies for the computer network and associated resource information, the topologies comprising at least one of either Internet Protocol (IP) and Multiprotocol Label Switching (MPLS) topologies;

determine label switched path (LSP) state information for the computer network;

build network state knowledge by aggregating the underlying network information, the topologies and associated resource information, and the LSP state information, wherein the network state knowledge is an aggregation of the underlying network information, the topologies and associated resource information, and the LSP state information;

establish communication within a dynamic network of other of the plurality of stateful computing entities sharing network state knowledge for parallel computation performance; and perform network computation based on the network state knowledge.

* * * * *